US008095314B2

(12) United States Patent
Wilson

(10) Patent No.: US 8,095,314 B2
(45) Date of Patent: Jan. 10, 2012

(54) GENERATION OF FOUR DIMENSIONAL GRID OF PROBABILISTIC HAZARDS FOR USE BY DECISION SUPPORT TOOLS

(75) Inventor: Ian A. Wilson, Port Orange, FL (US)

(73) Assignee: Embry-Riddle Aeronautical University, Inc., Daytona Beach, FL (US)

( * ) Notice: Subject to any disclaimer, the term of this patent is extended or adjusted under 35 U.S.C. 154(b) by 772 days.

(21) Appl. No.: 11/906,815

(22) Filed: Oct. 4, 2007

(65) Prior Publication Data
US 2008/0208474 A1 Aug. 28, 2008

Related U.S. Application Data

(60) Provisional application No. 60/849,237, filed on Oct. 4, 2006.

(51) Int. Cl.
*G01V 7/00* (2006.01)
(52) U.S. Cl. .................. 702/2; 702/3; 702/181
(58) Field of Classification Search .............. 702/3, 181; 706/21
See application file for complete search history.

(56) References Cited

U.S. PATENT DOCUMENTS
6,816,786 B2 * 11/2004 Intriligator et al. ............... 702/3

OTHER PUBLICATIONS

Klein, 'A 4D Flight Profile Server and Probability-Based 4D Weather Objects: Toward a Common-Core TFM Toolset for the NAS', Jan. 2005, GMU, pp. 1-7.*

* cited by examiner

*Primary Examiner* — Michael Nghiem
*Assistant Examiner* — Elias Desta
(74) *Attorney, Agent, or Firm* — Womble Carlyle Sandridge & Rice, LLP

(57) ABSTRACT

A new method and system for generating probabilities of objective values of hazards as a fine granularity grid in four dimensions (three spatial dimensions plus time) to be used by decision support and visualization tools. Utilizing the proposed system, proxies for hazard data received at different times and in different formats may be used as input data to a grid of intelligent software agents which generate a four dimensional matrix of probabilities of objective values of hazards. The method allows for proxies and/or subjective information on hazards that may arrive asynchronously and with coarse temporal and spatial accuracy to be converted into a standard fine granularity four dimensional hazard probability grid. The grid is created automatically, without the need for expert human interpretation, can provide visualization of the four dimensional hazard volumes and may be used directly by decision support tools without the need for expert human interpretation.

21 Claims, 22 Drawing Sheets

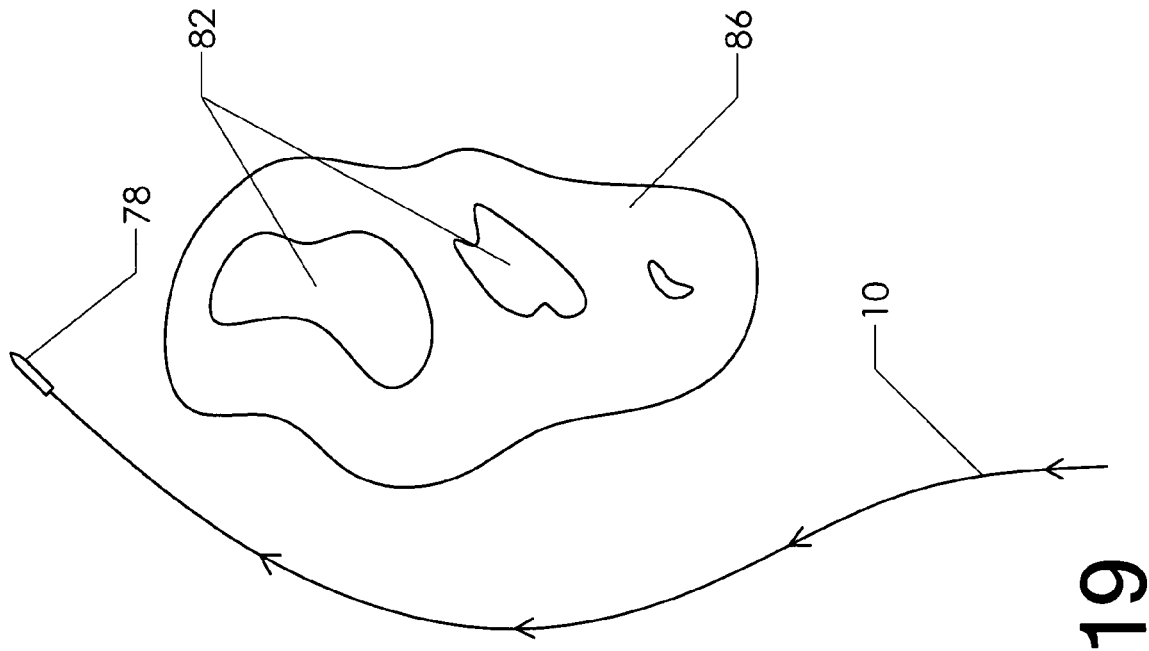
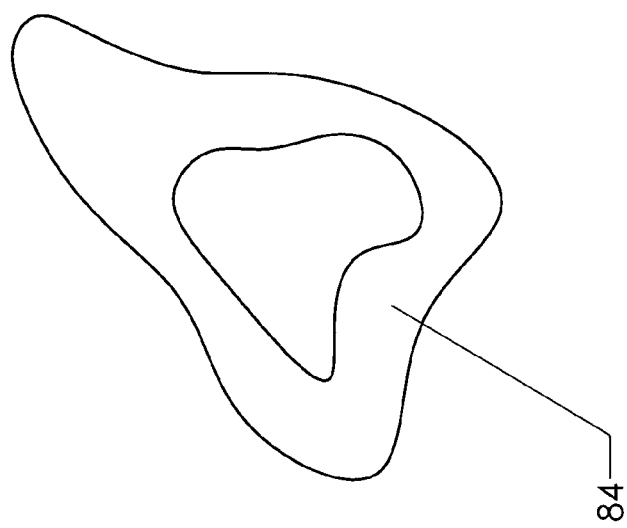
FIG. 19

GENERATION OF FOUR DIMENSIONAL GRID OF PROBABILISTIC HAZARDS FOR USE BY DECISION SUPPORT TOOLS

CROSS-REFERENCES TO RELATED APPLICATIONS

This application claims the benefit of the filing date of U.S. patent application No. 60/849,237 which was filed on Oct. 4, 2006.

STATEMENT REGARDING FEDERALLY SPONSORED RESEARCH OR DEVELOPMENT

Not Applicable

MIRCOFICHE APPENDIX

Not Applicable

BACKGROUND OF THE INVENTION

1. Field of the Invention

This invention relates to the field of risk management. More specifically, the invention comprises a method and a system for extracting hazard information from forecast data having varied temporal and spatial accuracies.

2. Description of the Related Art

Hazards and the use of hazard predictions are a significant concern for many industries, especially the aviation industry. Accordingly, the present invention is described and considered as it applies to aviation. The description of the related art will also refer generally to the aviation application. However, in reading this entire disclosure, the reader should bear in mind that the methods disclosed can be applied to many areas beyond aviation.

The general approach to hazard prediction in the aviation industry has been to utilize forecast data and other weather products which are commonly shared among various "users," such as dispatchers, pilots, and controllers. Each of the users works to ensure that the aircraft avoids flying in unacceptably hazardous weather.

The weather information is generated by weather forecasters in various formats (textual, graphical, or as gridded values or probabilities in large increments of time). The weather may be "observations" of weather as it was at a particular time, which by the time of receipt is actually in the past. Alternatively, weather information may be supplied as "forecasts." Forecasts are normally generated for periods of time into the future, again set in large increments of time (from several hours to several days). Forecasts generally describe the expected weather conditions rather than actual hazards.

These weather products in their current form require human interpretation. Furthermore, meaningful and accurate interpretation requires significant skill and experience. The aircraft operators are primarily interested in weather that will be dangerous to their aircraft operations and in weather conditions—such as winds and temperatures—that affect the efficiency of their flights. The users of the weather products therefore attempt to interpret meteorological data to find where hazards and favorable conditions exist. In addition, users typically need to access several different weather products and mentally integrate the information from them in order to develop a complete picture.

One common weather product is referred to as a Collaborative Convective-weather Forecast Product ("CCFP"). These forecasts often contain highly subjective values such as "confidence." Such qualitative values are difficult to use as inputs for other tools. Such forecasts are often presented in large time increments, often in hours. The reason for the large time increment is the amount of automated and manual data processing that is required for the generation of the forecasts. The user receives many weather products, and these products are often not in agreement and are not for the actual time in which the user is interested. The user of these products therefore needs to have some meteorological knowledge to judge which of the products to believe, to interpolate between the times of effectiveness of the products, and then to generate an assessment of the level of probability of hazards implied by the weather forecast.

The further into the future the prediction is carried, the less certainty there is that the forecasts will be correct. This is especially true of convective weather forecasting. Convective weather is the source of turbulence, hail and lightning, all of which are hazards to aviation. The certainty of the forecast is normally expressed as a "probability" of the forecast weather occurring. With the convective weather forecasting example, this is stated in terms of "radar cloud tops," and "likely percentage coverage of a several thousand square mile area" reader will note that the CCFP does not express probabilities of the hazards such as turbulence in objectively quantifiable terms specific to turbulence. Even when turbulence is forecast by some products it is in subjective values such as "moderate." Of course, turbulence that is moderate for a large aircraft may be severe for a small one.

Users who are planning flights are required to identify hazards to the flight and attempt to quantify them and their affect on their aircraft. However, the user is presented with conflicting views of weather from the various data sources. The large time between forecast updates is also a problem, since a first available forecast may be for a point in time one hour before the flight passes a point and the next forecast an hour after the flight has passed.

FIGS. 1 and 2 illustrate the problem of using historical weather data. FIG. 1 shows weather data for the continental United States at the flight planning stage. Aircraft 16 is to fly from Los Angeles, Calif. (denoted as origin 12) to Atlanta, Ga. (denoted as destination 14) along planned route 10. The dispatcher typically evaluates the route approximately 1 hour before takeoff. The weather data may be 30 minutes old when the dispatcher evaluates the route. The weather data of FIG. 1 illustrates a moving storm front 18 with associated storm cells. Storm front 18 intersects a portion of planned route 10 at the time the weather was observed.

As shown in FIG. 2, by the time aircraft 16 is within 2 hours of destination 14, storm front 18 has moved beyond destination 14. In this example, the dispatcher may have correctly predicted that planned route 10 would avoid storm front 18.

In the example illustrated in FIGS. 1 and 2, the dispatcher used radar data as proxies for hazardous weather conditions. Weather data is not always a reliable proxy for predicting a hazardous condition. Radar returns generally show raindrop density. As illustrated in FIG. 3, a radar return illustrates the presence of storm cell 20 and storm cell 22. Regions 30 denote areas of heaviest rain. Regions 28, 26, and 24 illustrate heavy rain, moderate rain, and light rain respectively. An inexperienced dispatcher viewing weather data as proxies for hazardous conditions might look at such a radar return and determine that flying between storm cell 20 and storm cell 22 would be the safest route. Severe turbulence zone 34 actually exists between storm cell 20 and 22—an area the proxy data suggests should be free and clear of hazardous conditions. In addition, hail can be blown well clear of the hazard area indicated by the proxy as illustrated by potential hail zones 32.

BRIEF SUMMARY OF THE INVENTION

The present invention comprises a new method and system for generating probabilities of objective values of hazards as a fine granularity grid in four dimensions (three spatial dimensions plus time) to be used by decision support and visualization tools. Utilizing the proposed system, weather data received at different times and in different formats may be used as input data to create a fine four-dimensional grid of intelligent software agents. The method allows for proxies and/or subjective information on hazards that may arrive asynchronously and with poor temporal and spatial accuracy to be converted into a standard four-dimensional hazard probability grid. The grid is created automatically, without the need for expert human interpretation.

The data assimilation and conversion is performed by intelligent software agents. These agents convert the input data into hazard probabilities at one or more four dimensional points. These points are represented as nodes in a four dimensional matrix. Each node communicates its current hazard probabilities to its neighbors in space and time. The neighboring nodes ensure that the probability gradient and probability density functions follow the correct rules for the hazard type in the current or future environment. The result is that information on a proxy for a hazard is translated into a hazard probability of an objective value of the hazard at a point on the four dimensional grid. The probability values for that hazard objective value for all the neighboring points then change to represent the correct probability gradient.

This approach integrates the input information and the users decision support tools so that the user may easily search the four-dimensional grid for four dimensional 'volumes' of high probability of hazards and choose the least-risk path through the four-dimensional matrix. The grid is updated with each asynchronous observation or forecast product input and generates the hazard probability grid at regular and frequent intervals. The hazard probability grid can be used to provide visualizations of the hazard levels for display to the users.

BRIEF DESCRIPTION OF THE SEVERAL VIEWS OF THE DRAWINGS

FIG. 19 is a graphical display, showing two-dimensional representations of probabilistic hazards and a route to be followed by a container ship to avoid the hazards.

Figure 1:
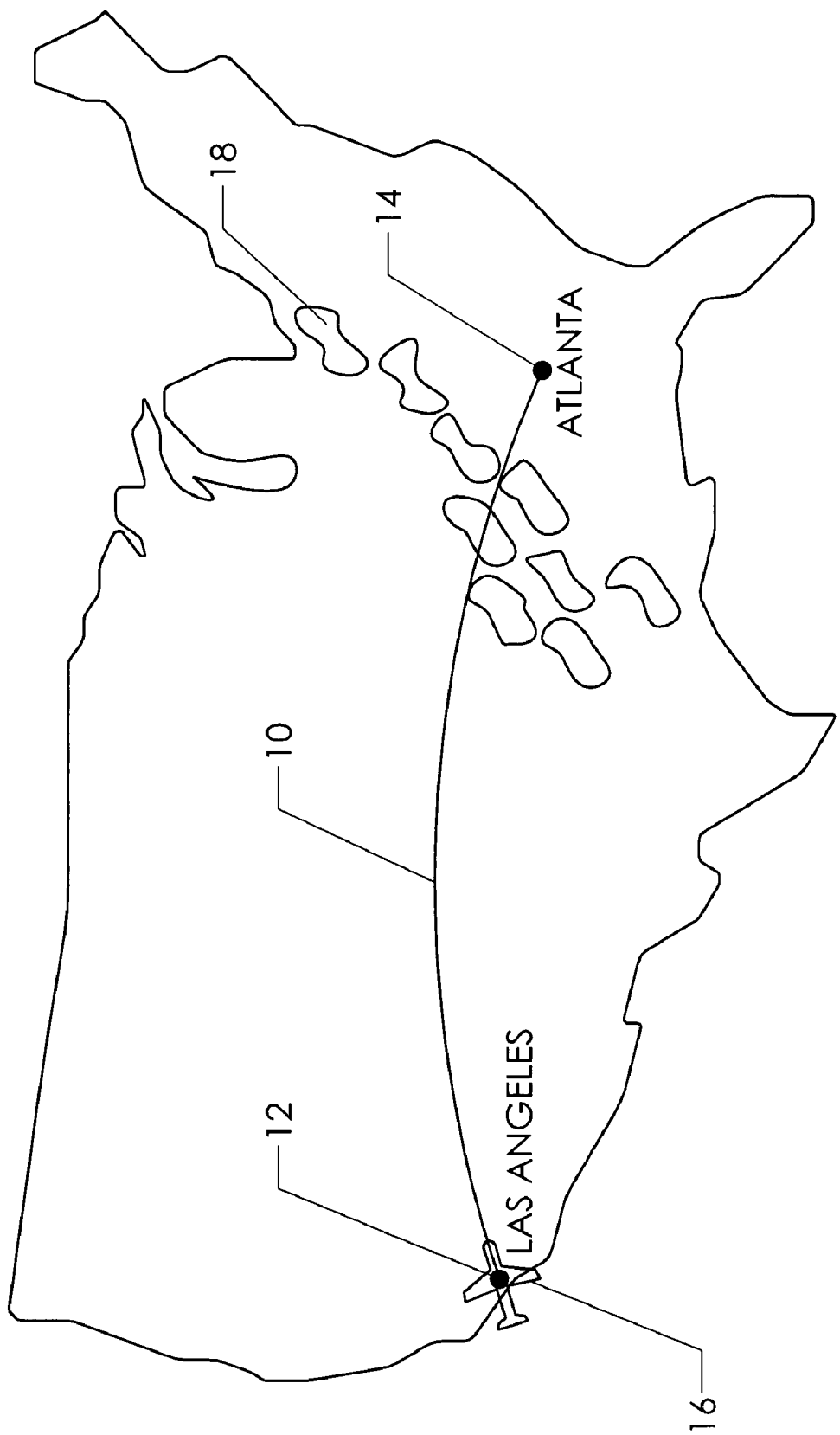
FIG. 1 is a graphical depiction of a planned route and historical weather data.
Figure 2:
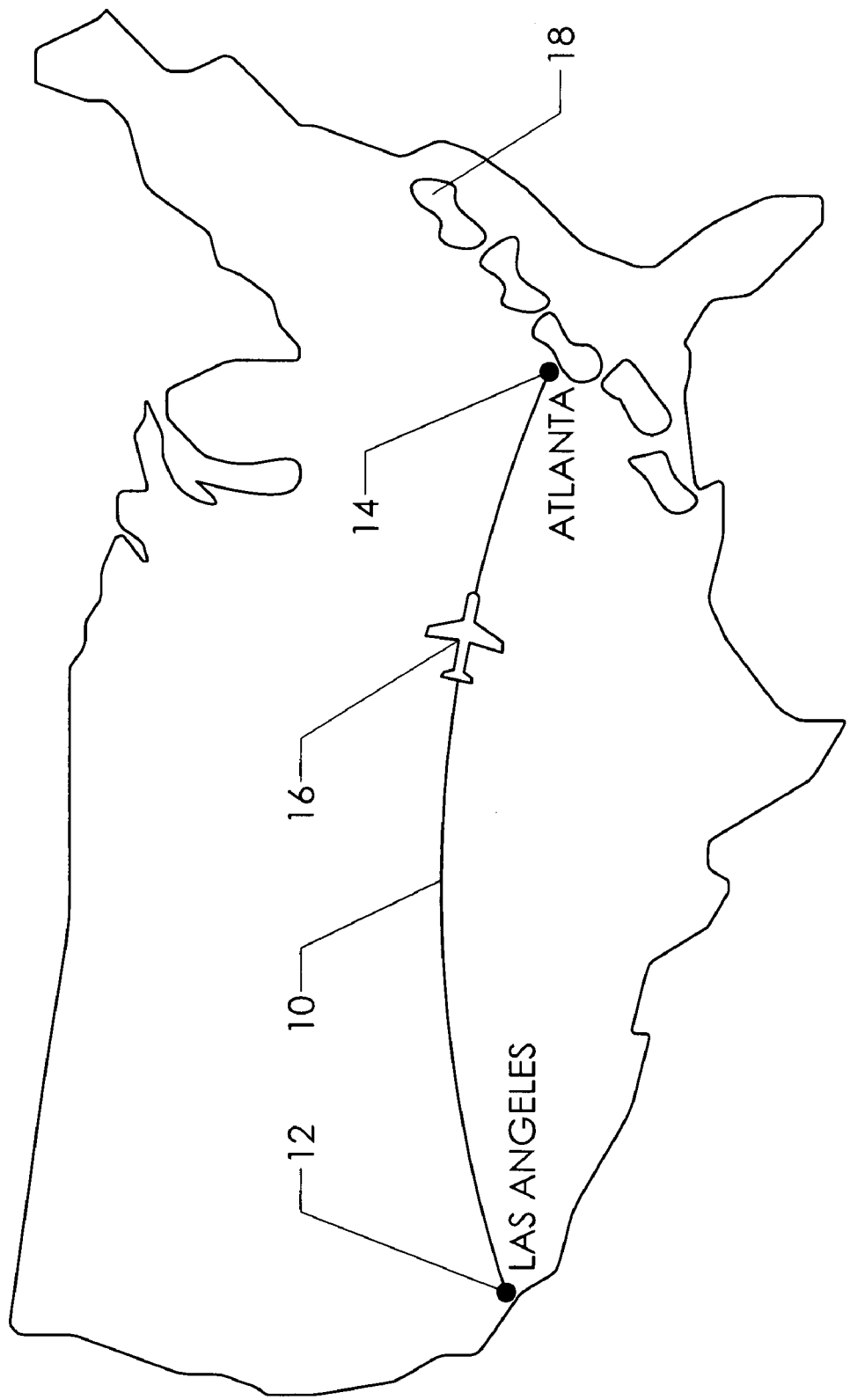
FIG. 2 is a graphical depiction of a planned route and historical weather data.
Figure 3:
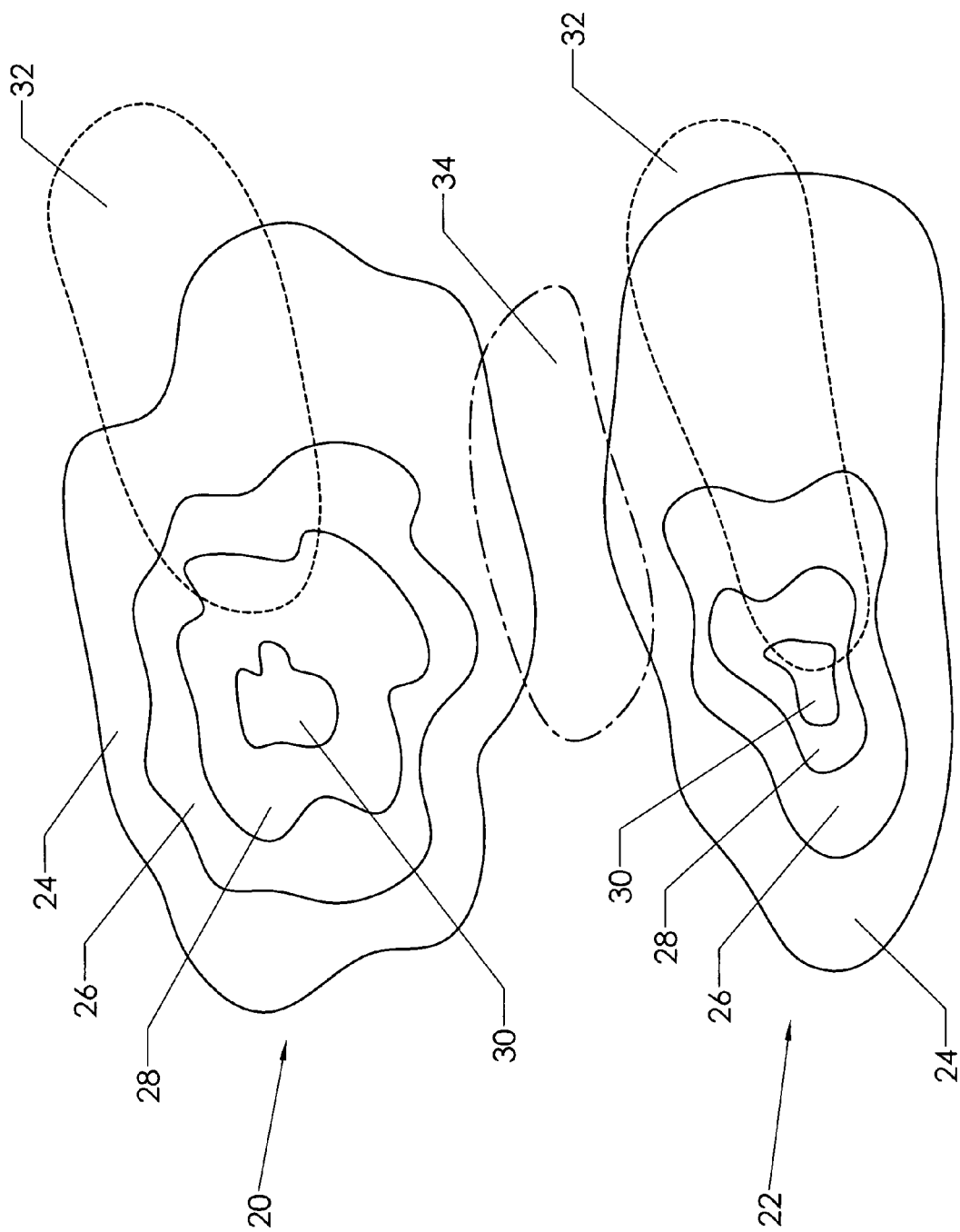
FIG. 3 is a graphical depiction of a radar return.

| REFERENCE NUMERALS IN THE DRAWINGS | | | |
|---|---|---|---|
| 10 | planned route | 12 | origin |
| 14 | destination | 16 | aircraft |
| 18 | storm front | 20 | storm cell |
| 22 | storm cell | 24 | region |
| 26 | region | 28 | region |
| 30 | region | 32 | potential hail zone |
| 34 | severe turbulence zone | 38 | grid |
| 40 | node | 42 | local peak |
| 44 | altitude | 46 | jetliner |
| 48 | general aviation aircraft | 50 | risk exceedance zone |
| 52 | terrain hazard | 54 | weather hazard |
| 56 | combined hazard | 58 | traffic hazard |
| 60 | terrain hazard | 62 | risk aversion scale |
| 64 | instantaneous risk aversion | 66 | radar installation |
| 68 | radar coverage zone | 70 | terrain |
| 72 | altitude AGL | 74 | icing hazard |
| 76 | turbulence hazard | 78 | container ship |
| 80 | wave crest | 82 | land |
| 84 | wave/wind hazard | 86 | shallow hazard |
| 88 | observed/reported information | 90 | conversion software |
| 92 | grid | 94 | export process |
| 96 | data store of hazard values | 98 | application program interface |
| 100 | DST applications | 102 | low visibility hazard |

DETAILED DESCRIPTION OF THE INVENTION

Figure 20:
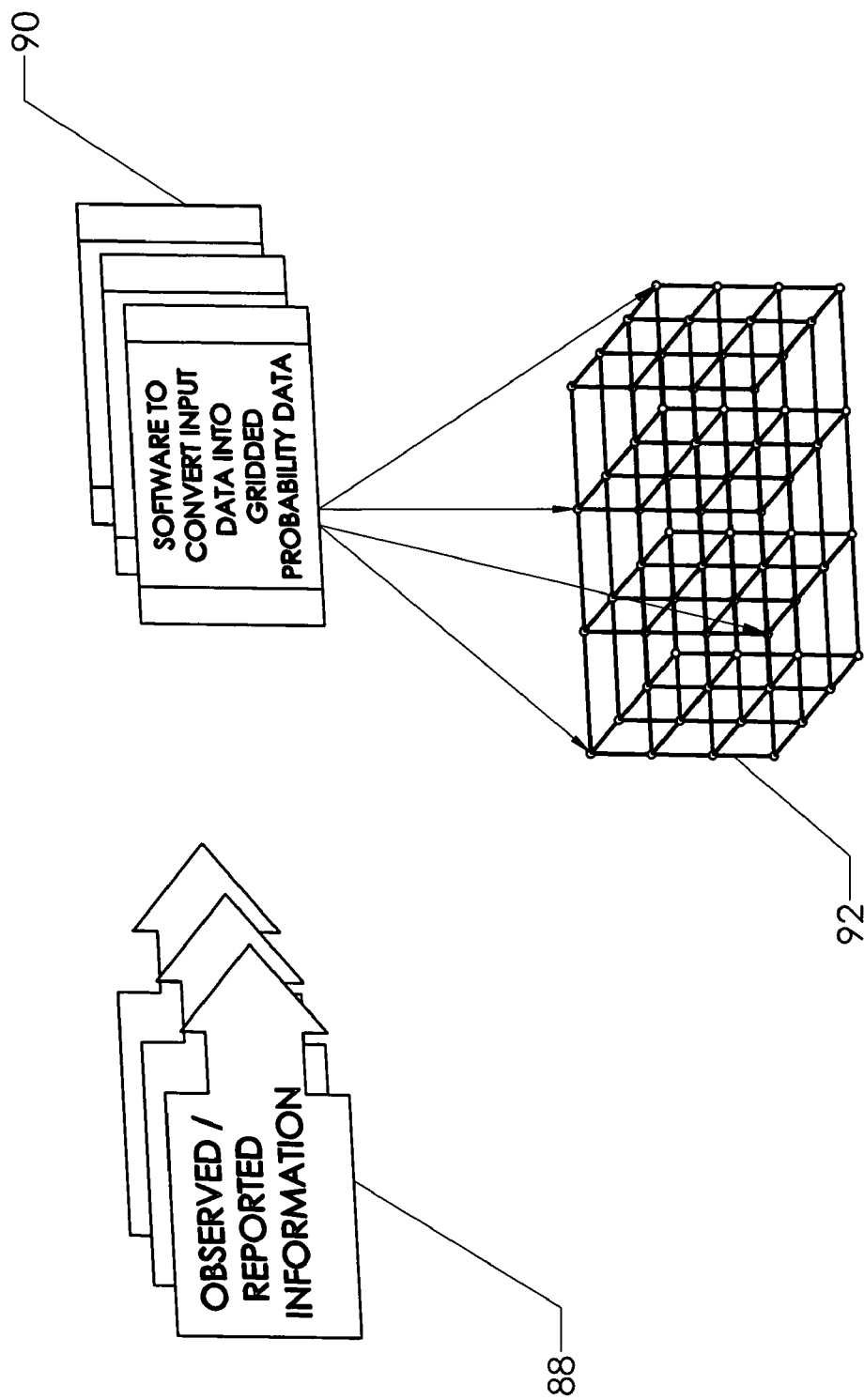
FIG. 20 is a diagram, illustrating the input of data into a four-dimensional grid.
Figure 21:
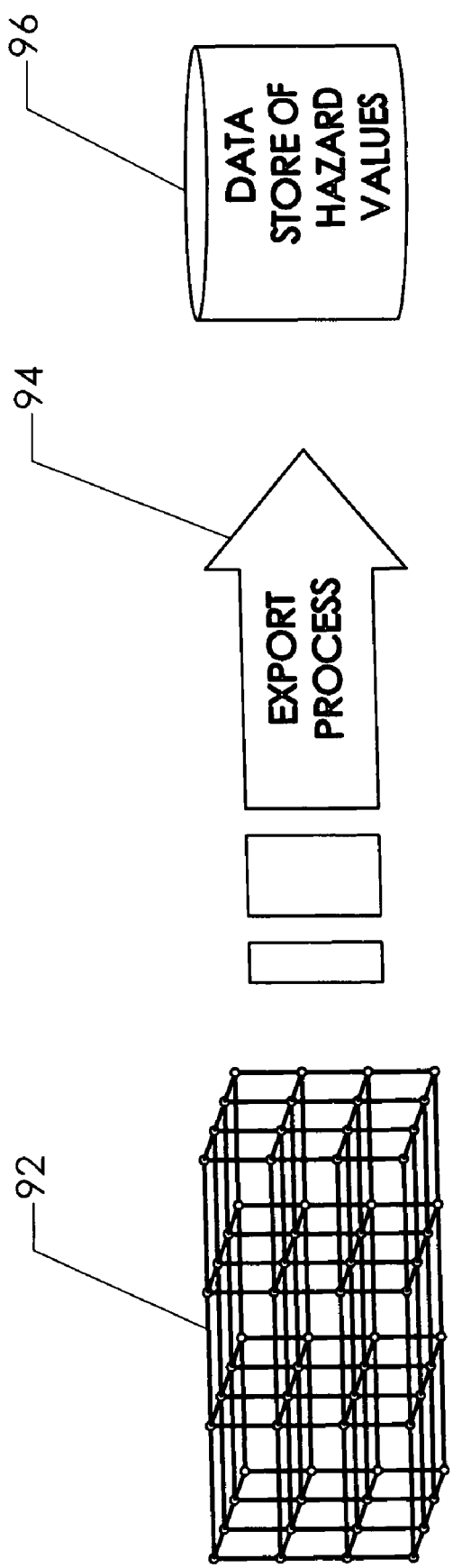
FIG. 21 is diagram, illustrating the regular export of the probability values from the four dimensional grid to a data store.
Figure 22:
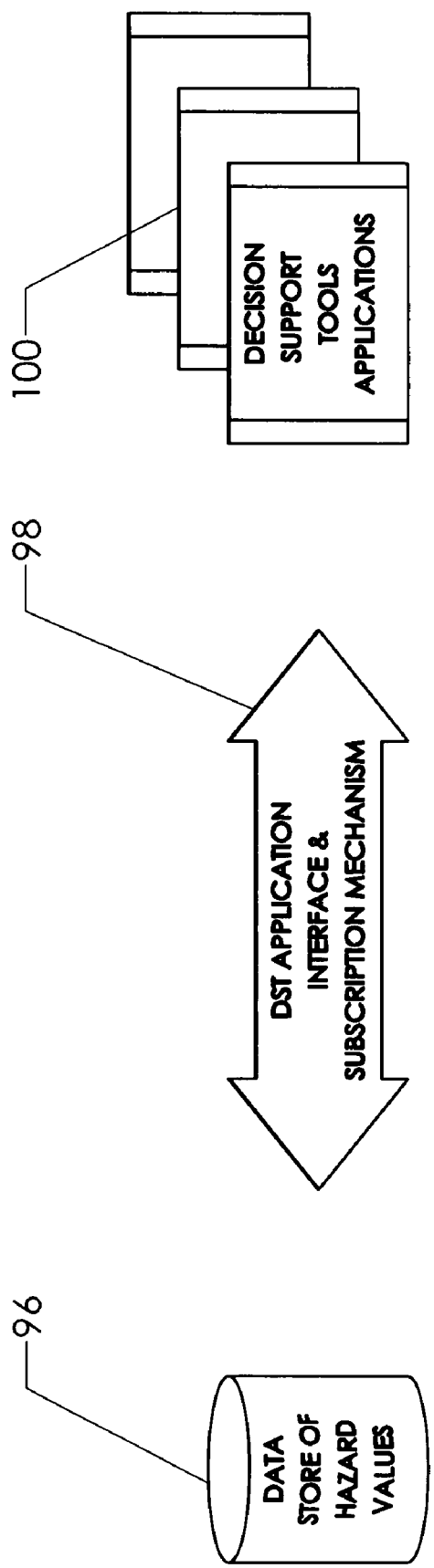
FIG. 22 is a diagram, illustrating the interface between decision support tool applications and a data store.

FIGS. 20-22 show an overview of a process for generating a four-dimensional hazard probability grid for predicting locations of hazardous conditions and providing hazard probability data to a user in a useful form. FIG. 20 shows a schematic depiction of a grid, with individual points or nodes in the grid being shown as ovals. The process generally involves assembling forecast and observed/reported information 88 and manipulating these input data using conversion software 90 to create probabilities of objective values of hazards as an input into the fine granularity, four-dimensional probabilistic agent grid 92. Observed/reported information 88 may include information from observations and predictions arriving asynchronously for any time period and any three-dimensional position in the grid of hazard data. Observed/reported information 88 is usually reported in large time and spatial increments. As an example, observed weather information is often reported in hourly increments for controlled airports with forecasts every six hours. The present invention manipulates these data and presents them in a fine spatial and temporal grid which is a more readily usable format for the Decision Support Tools.

FIG. 21 shows how the hazard grid data is exported for use in decision support tools. Grid 92 is a simple four dimensional data array of hazard objective values and associated probabilities. The grid is regularly updated and the values stored in the grid are then exported to data store of hazard values 96 via export process 94. This four-dimensional hazard data is maintained in data store of hazard values 96 so that the hazard may be further transmitted to the recipients' decision support tool ("DST") applications as will be described in greater detail subsequently.

There are many applications for which four-dimensional representations of hazards are useful. For example, it may be used to forecast probabilities of hostile troop movements or certain types of weapon systems. The decision support tools may incorporate this forecast information to identify the type of approach which is most likely to avoid engagement or detection. It may also be used to forecast the effect of a hazardous material explosion on an area. The decision support tools may be configured to forecast areas that would be safe for emergency response teams from building debris and nuclear/biological/chemical results of the explosion. Many other applications are possible, but for greater clarity the description will first focus on the implementation of four-dimensional representations of aviation hazards for use in decision support tools.

As mentioned previously, the process has as its input any or all normal forecast and observed/reported information 88. This information may already be "gridded" but typically at large temporal and spatial intervals (such as with the Rapid Update Cycle weather model). The information may be graphical and textual, showing a probability of an event or proxy event in the future (such as forecast radar echo tops and forecast composite reflectivity in a CCFP). This information requires translation into the probability of one or more hazards for which they are a proxy. This translation is performed by conversion software 90. For example, high radar echo tops and high radar reflectivity are used as proxies for the presence of turbulence, hail and lightning.

Observed/reported information 88 may also be in the form of specific reports of a hazard, such as a pilot reporting severe clear air turbulence. Accordingly, the imported data may include data of the following types:

1. textual reports of actual hazard occurrences and their subjective or objective values;
2. numerical reported data for a small area;
3. gridded data that covers all or a subset of the grid but at a coarser spatial and temporal resolution (These values may need to be converted to hazard probabilities and interpolated to the grid points); and
4. graphical data that requires interpretation, such as a probability boundary (This could be the CCFP warnings) or a Significant Meteorological (SIGMET) Advisory in aviation terms; or even a synoptic forecast chart.

As shown in FIG. 20, conversion software 90 reads each observation or forecast information type and converts the information into four-dimensional probabilities of objective hazard values (three spatial dimensions plus time). In doing so, conversion software 90 identifies the time and place of these probabilities. As an example, a report on existing conditions at a point will have a probability of 1 (100%) whereas a forecast of the same conditions at that point but several hours into the future may have a maximum probability of 0.6 (60%) due to the known inaccuracy of forecasting that hazard.

Accordingly, conversion software 90 is concerned with the conversion of:

1. deterministic values to probabilistic values;
2. subjective values to objective values; and
3. graphically displayed proxies for the values of concern and proxy forecasts to the four dimensional probabilities of objective values of hazard.

FIG. 20 shows the asynchronous input information as observed/reported information 88. Conversion software 90 converts this information and input these values to the agent(s) in the correct four-dimensional position in four-dimensional probabilistic agent grid 92. The agents in the grid represent a particular three-dimensional point in space at a particular instant in time. The values at that point are updated for each step into the future. The point in space represented by the agent will have influences from the geography around that point. This geographical factor can be held as a set of rules for how particular hazards affect that point in space. For example, in the aviation case, a point in space that is just downwind of a mountain may always set a probability of turbulence based on the wind direction and speed, even without an external input. In addition, a point in space that is inside a mountain would have a probability of 1 (100%) of hazard to aviation all the time.

Figure 4:
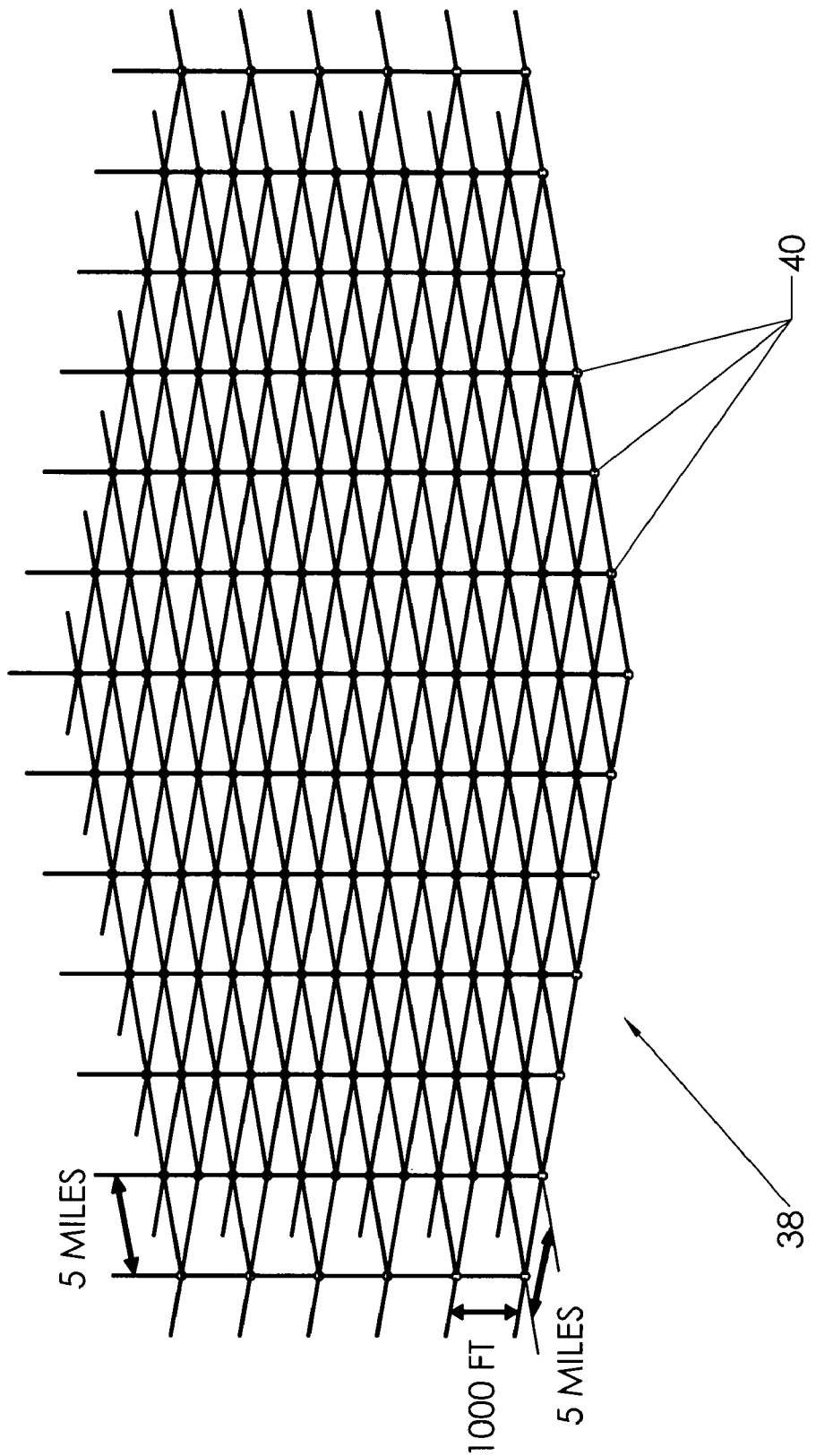
FIG. 4 is an illustration of a three-dimensional grid of software agents.

FIG. 4 illustrates a small number of intelligent agent nodes on the four-dimensional grid, with an indication of the communication of probability and state changes between the nodes. The actual grid would consist of a three-dimensional grid of intelligent software agents (or "nodes") representing the entire volume of airspace. The fourth dimension of time would be included by creating a set of three-dimensional grids for each time period out to the future time limit of forecasting. In the example shown in FIG. 4, grid 38 is a three-dimensional grid with nodes 40 corresponding to locations in three-dimensional space separated by five nautical miles in a North/South/East/West grid and one thousand feet in altitude. There may then be a three dimensional grid for each 15 minutes from 15 minutes in the past out to 12 hours in the future. Other granularities for time and space may also be used.

Parameters are defined for each node 40 on grid 38. Rules are also defined to govern the interaction of each node with neighboring nodes. These "rules" are preferably modifiable, so that the grid can "learn" as it accumulates data over time. The term "neighboring node" generally refers to a node that is adjacent to the reference node on the three dimensional grid. In the present example, a neighboring node is a node corresponding to a location in space that is approximately 5 miles from to the point in space corresponding to the reference node.

Multiple existing predictive models can be fed into each node. In the weather hazard example, these would be weather forecasting models. These weather forecasting models may be updated every 15 minutes or when new data is input into grid 38. For example, the grid may be updated when a pilot observes and reports turbulence or icing at a location or wind gusts are observed on the ground.

Figure 5:
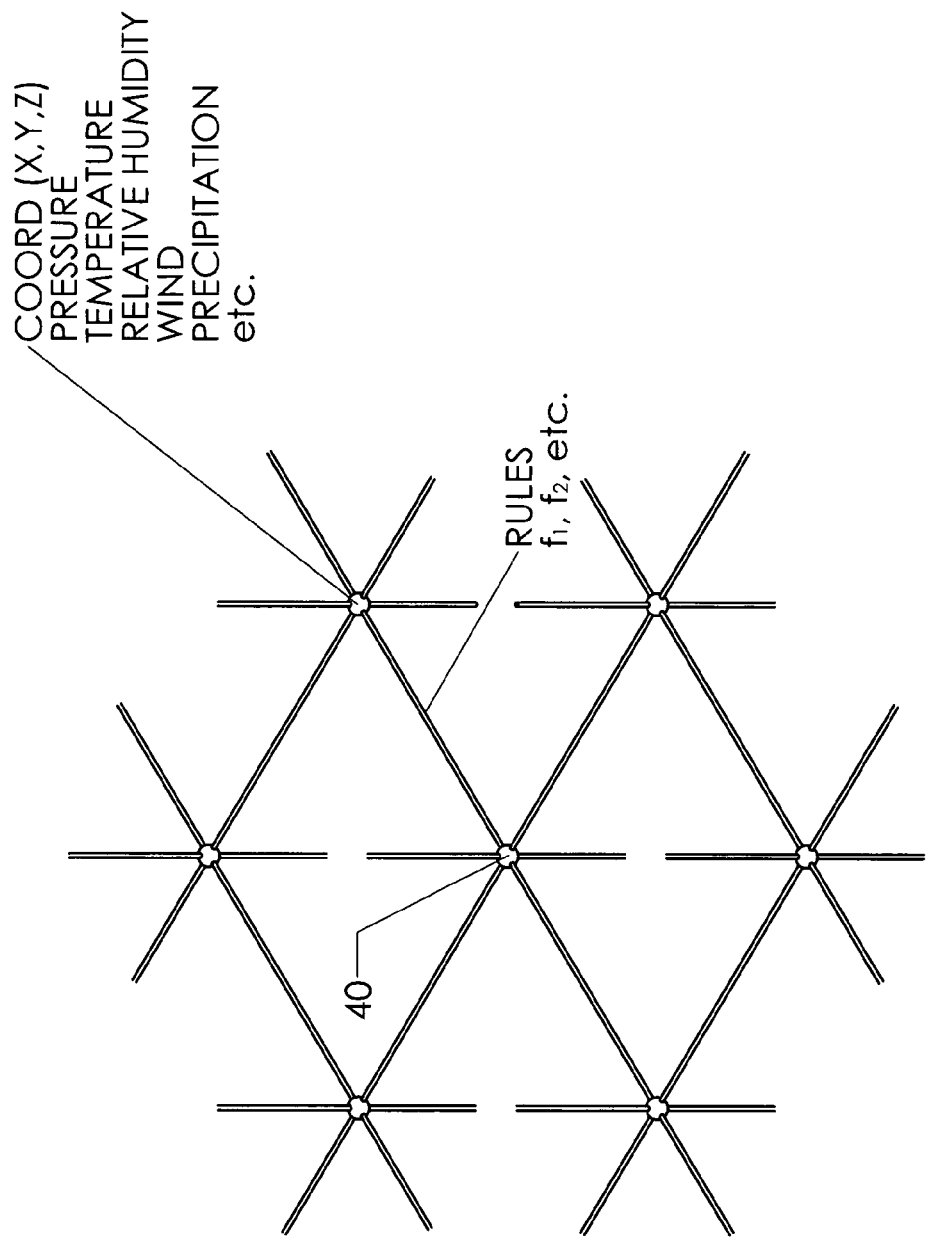
FIG. 5 is a detail view of a three-dimensional grid of software agents.

FIG. 5 shows a detailed view of a portion of grid 38. As mentioned previously, each node 40 in grid 38 represents a point in space and time. Each node has a set of parameters. Each link between adjoining nodes includes a set of rules describing how the neighboring node relates to the reference node and vice versa. It is preferably that some of the parameters to be stated in terms of the probability of a condition existing at the point in space represented by the node. For example, while pressure and temperature may be actual fixed values, actual hazards such as precipitation, icing conditions, and turbulence can be given as probabilities. When node 40 receives a probability of an objective value and possibly a probability skew definition, either from a neighboring agent or from an input agent, the agent uses the rules to first set the probability of that objective value at the point it represents and then send a probability of an objective value and the probability skew if necessary to its neighbors in time and space. Those that are skilled in the art will appreciate that the computer implementation of this logic may differ in order to achieve a greater processing efficiency.

Figure 6:
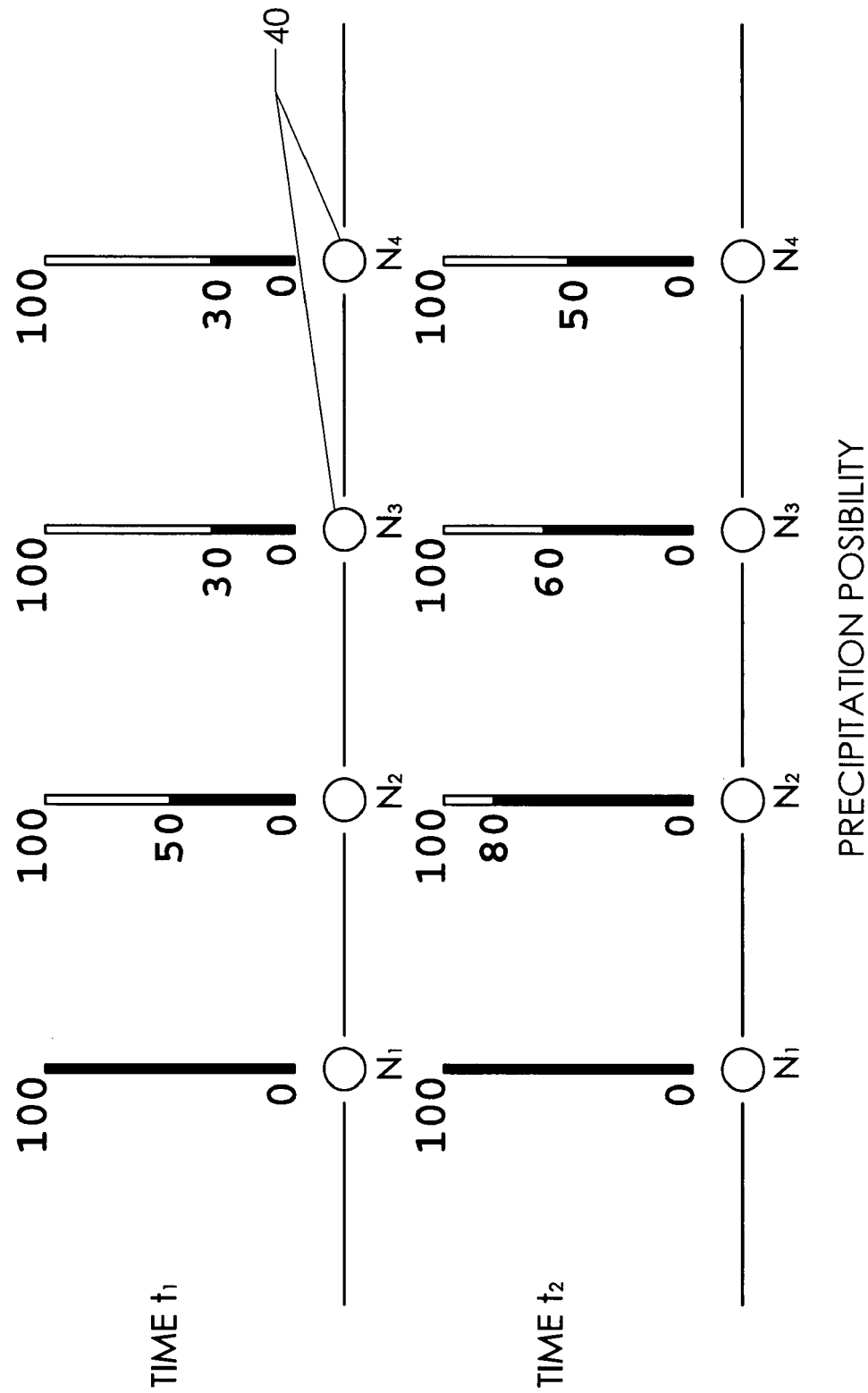
FIG. 6 is an illustration of a simplified two-dimensional grid for determining the probability of rainfall.

FIG. 6 is a very simple two-dimensional grid example showing how a probability of a condition "ripples through" the grid. At time $t_1$, rain is observed at the location corresponding to node $N_1$. The fact that it is actually raining at node $N_1$ increases the probability of rain at nodes proximate to $N_1$ including nodes $N_2$, $N_3$, and $N_4$. The probability of rain at each node at time $t_1$ is illustrated by the bar graphs above each node. At time $t_2$, the probability values for precipitation change at $N_1$, $N_2$, $N_3$, and $N_4$ in accordance with the rules prescribed by the weather forecast models embedded in each node 40.

The concept of nodes 40 passing probabilities of objective hazard values and skews between each other may be modeled as a Petri-Net which consists of "places," transitions, and arcs that connect them. The places pass values and transitions between them, and in the present example, the places represent actual three-dimensional positions at a particular time. If a Petri-Net model is used, each node 40 represents a single intelligent node or agent at a four-dimensional position on the grid. It receives change of state input(s) from another node that first received information. Each node 40, when given the probability of an objective hazard value, pass their new values to their neighboring agents in space and time via continuous/logical change of states.

As time passes, the intelligent agents representing the nodes in the four-dimensional grid and their associated hazard data move into the past. The intelligent nodes can then compare their hazard values with the actual values and the values that were forecasted. The intelligent nodes then construct the new intelligent agents in the future for their three-dimensional position and include, if necessary, corrective parameters for future input values from forecasts and inputs from particular input agents.

Figure 7:
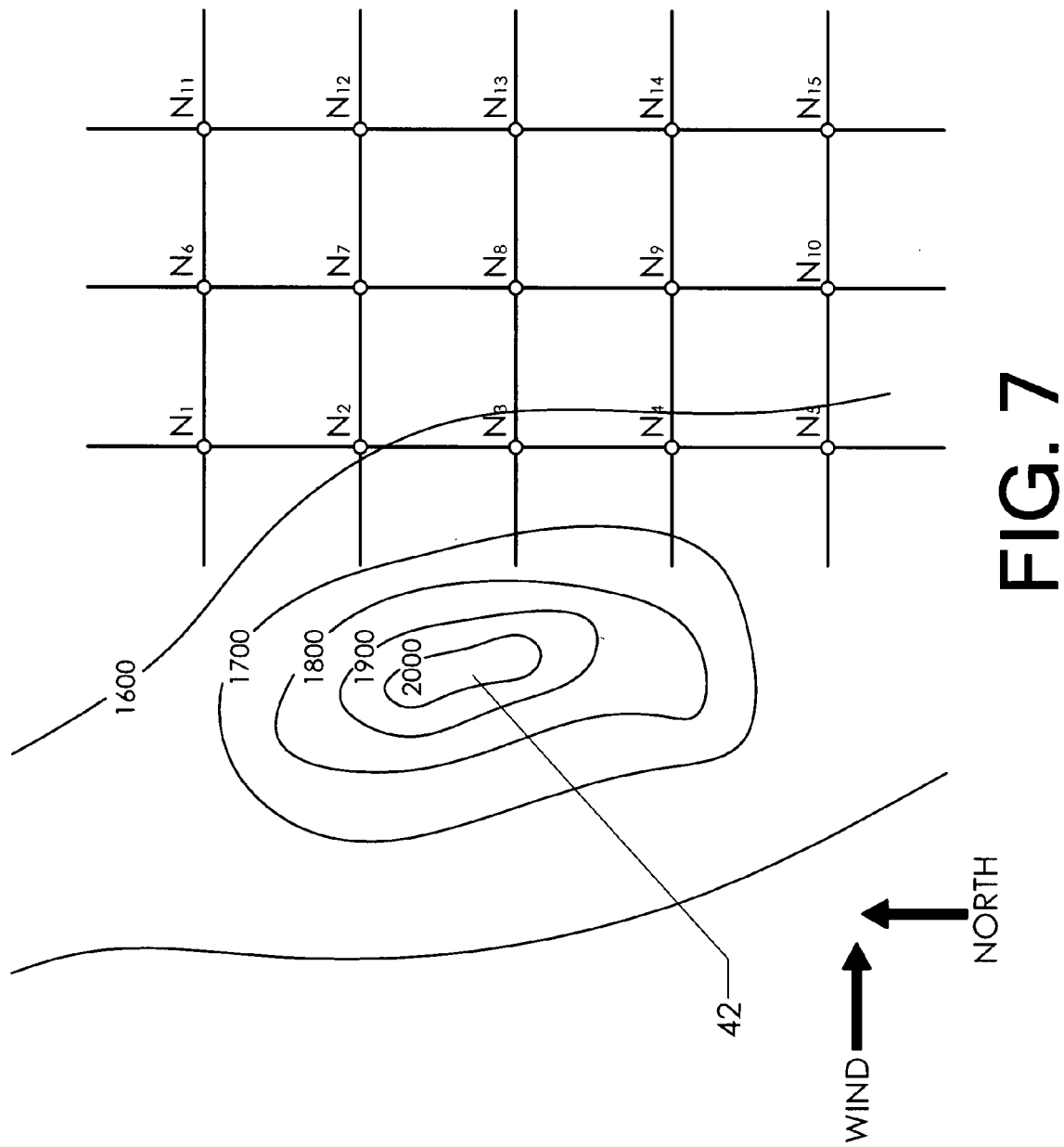
FIG. 7 is an illustration of a portion of a grid representing a geographic region adjacent to a mountain.

FIG. 7 illustrates how the "rules" governing the behavior of nodes may be updated over time to "learn" from observed trends. Local peak 42 corresponds to a mountain peak. Actual reports for that position may establish the fact that with particular wind directions, there is always a level of turbulence. A west wind will tend to produce turbulence proximate the nodes that are downwind of local peak 42. Thus, when a west wind is observed, a higher probability of turbulence would be predicted at nodes $N_2$, $N_3$, and $N_8$. There are more complex formulae that are used in meteorology that could be applied to inputs from particular types of forecasts and ensemble forecasts.

Various algorithms may be employed to implement such "corrections" to the embedded models. In one example, the actual values of the hazards at the present time are returned to the intelligent agents that had made forecast inputs to the grid. These values will allow the input agents to correct their Bayesian trust levels in the probabilities that are generated.

Referring back to FIG. 21, on a periodic basis, or when a particular threshold value is passed, four-dimensional probabilistic agent grid 92 exports the probabilities of objective hazard values into data store of hazard values 96. This database holds the four-dimensional grid of the probability of objective hazard values. The database is said to store the information in fine granularity. "Fine granularity" means that the spatial and temporal resolution of the information must be suitable for the user's applications and decision support tools. In the aviation meteorological hazard example, the decision support tools would preferably utilize hazard probability data with time increments of no more than 15 minutes and spatial increments of 5 miles latitude and longitude and one thousand feet altitude.

A different resolution may be better suited to a non-aviation application. If a nautical system were used as an example, the granularity in miles may be ten nautical miles with the vertical dimensions being in ten feet increments limited to an altitude up to 500 feet above the sea surface and temporal granularity of thirty minutes. Also, other hazards may be required such as wave height.

As illustrated in FIG. 21 and described previously, grid 92, which contains the calculated values of objective hazard value probabilities, is exported to data store of hazard values 96. The data may then be accessed for use by decision support tools. FIG. 22 schematically depicts this data extraction. Decision support tool applications 100, which may include simple visualization tools, may access the data store of hazard values 96 via application program interface 98. The data interface describes the format of the data and the subscription method to be used. As the quantity of data will be large, decision support tool applications 100 may be configured to subscribe to a small segment of the data from the data base that covers their areas of interest (such as a limited geographic region).

Accordingly, application program interface 98 includes a subscription mechanism to allow decision support tool applications 100 to interface with the data store. The subscription mechanism can be further configured to allow the decision support tools to receive automatic updates of information, to limit the amount of the information that they require, or to limit the type of hazard that they require. Decision support tool applications 100 may be further configured to find the least hazardous route through the area of the real world represented by the four-dimensional grid of data. This functionality will be described in greater detail subsequently.

Figure 8:
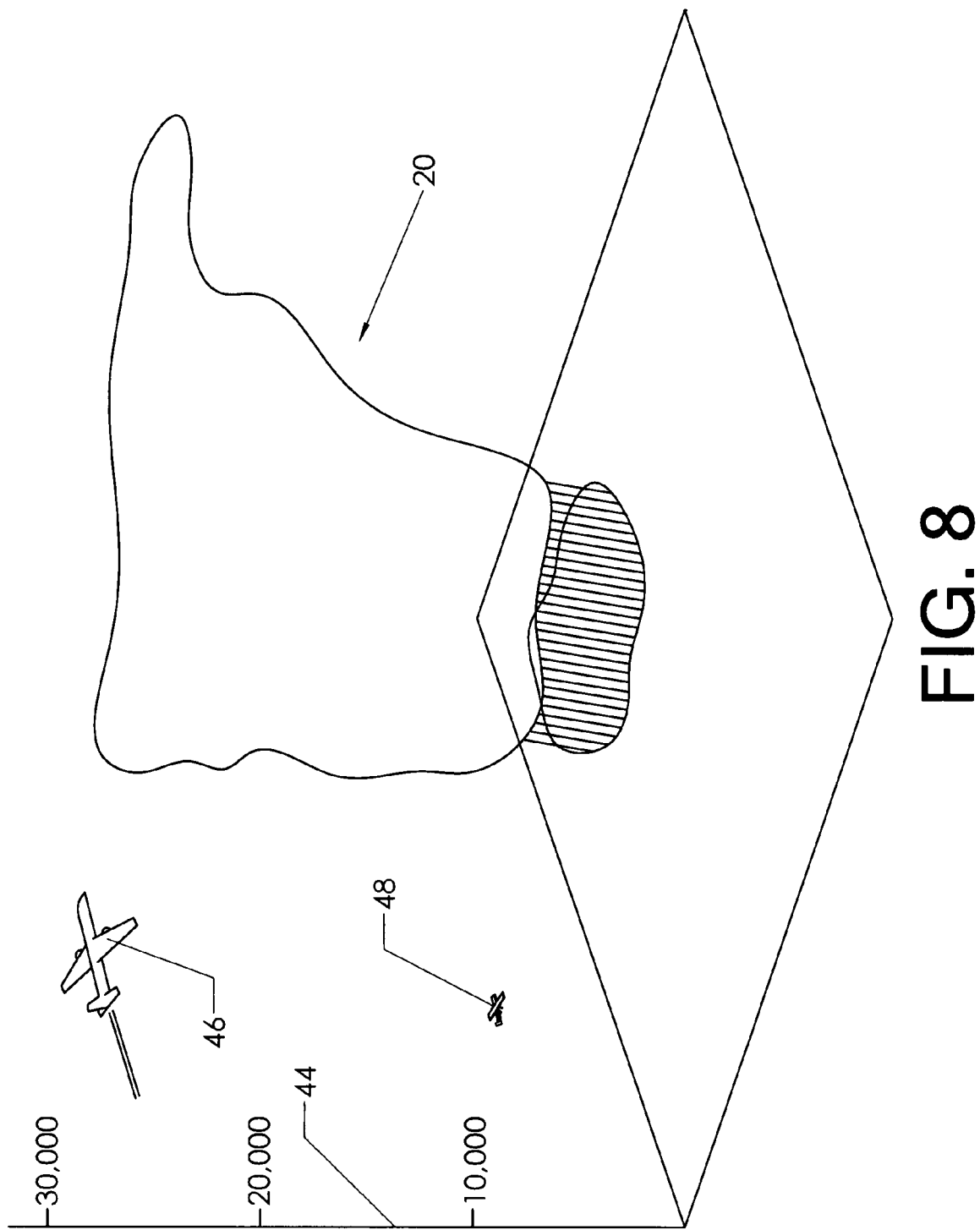
FIG. 8 is a graphical display, illustrating a volumetric representation of a weather hazard.

FIG. 8 is a graphical depiction of a weather hazard, storm cell 20, occupying a three-dimensional space at a designated time. Storm cell 20 has tops at 28,000 feet. Storm cell 20 would appear as a substantial hazard on a conventional weather plot (where radar returns are used as a proxy for a hazard). However, since transcontinental jetliner 46 is flying at 38,000 feet, storm cell 20 does not pose a hazard to it. On the other hand, general aviation aircraft 48 has a service ceiling of 12,000 feet. Thus, general aviation aircraft 48 should attempt to avoid the hazard posed by storm cell 20.

Figure 9:
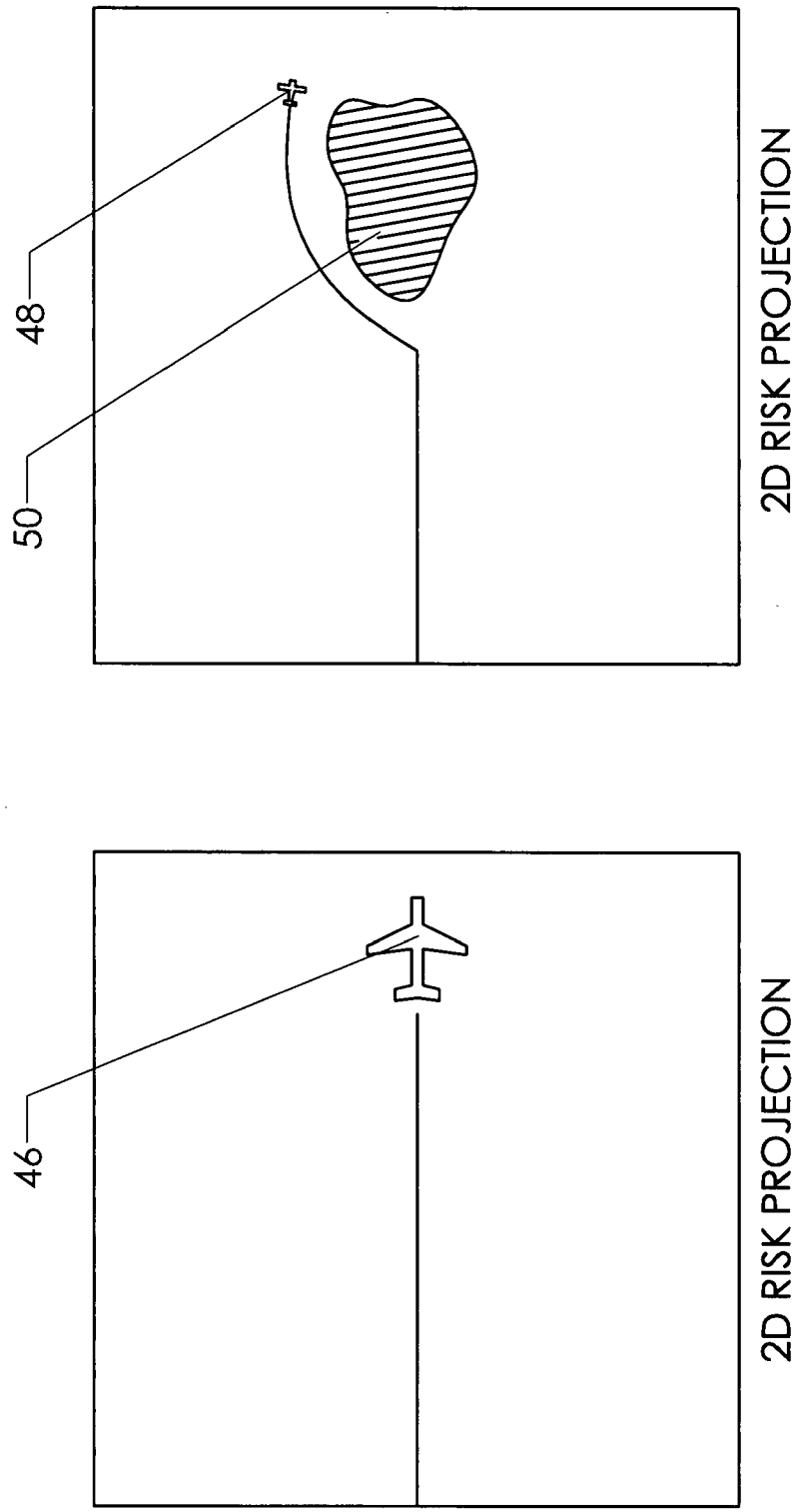
FIG. 9 is a two-dimensional risk projection for a jetliner and a general aviation aircraft.

FIG. 9 illustrates vehicle-specific, two-dimensional risk projections of the hazard shown in FIG. 8. In the risk projection for jetliner 46, no hazard appears since storm cell 20 is well beneath the cruising altitude of jetliner 46. The two-dimensional risk projection for general aviation aircraft 48 reveals the hazard as risk exceedance zone 50. This depiction reveals to the pilot or dispatcher that the trajectory of general aviation aircraft 48 should be altered to avoid the hazard.

Figure 10:
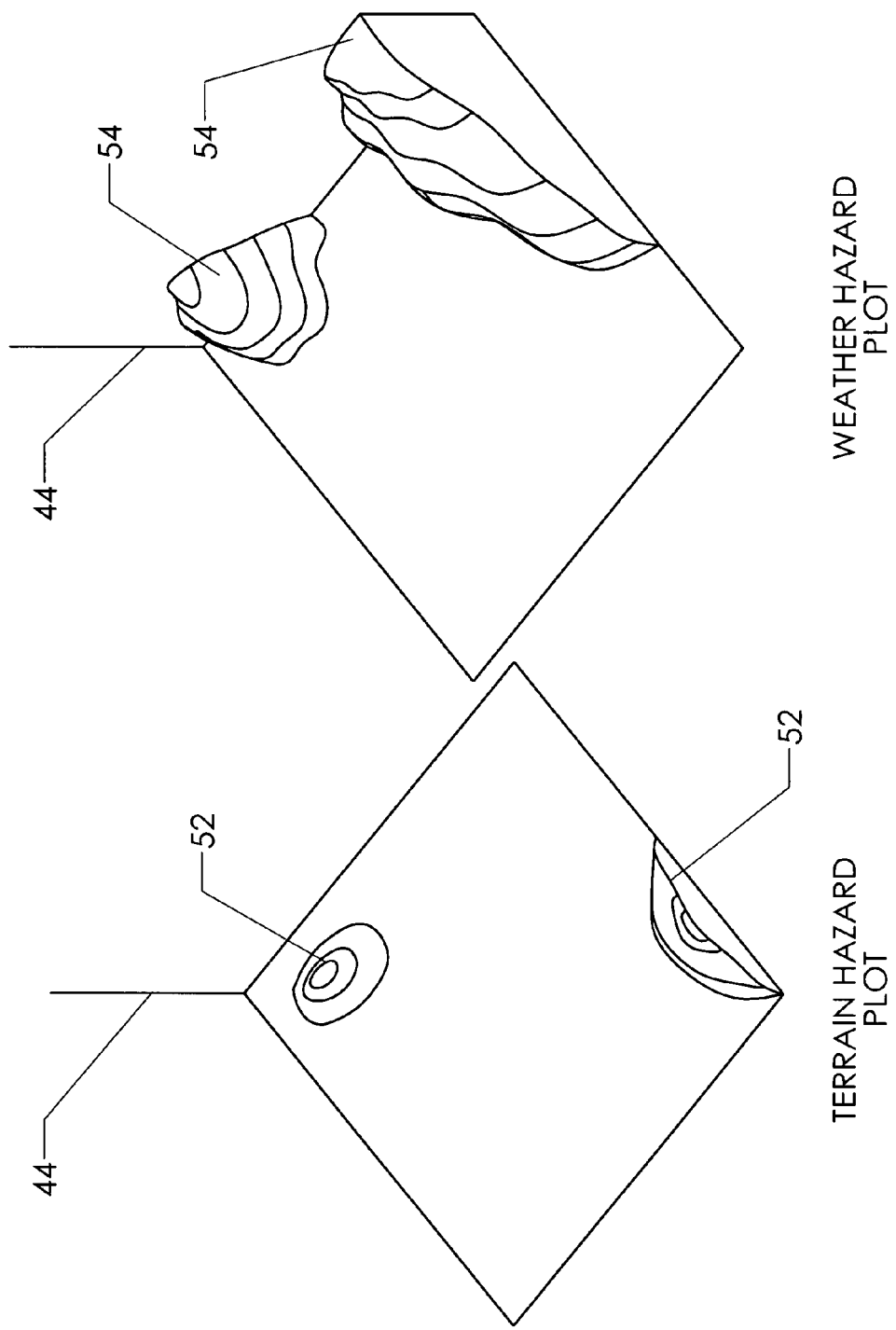
FIG. 10 is a three-dimensional representation of terrain and probabilistic weather hazards.
Figure 11:
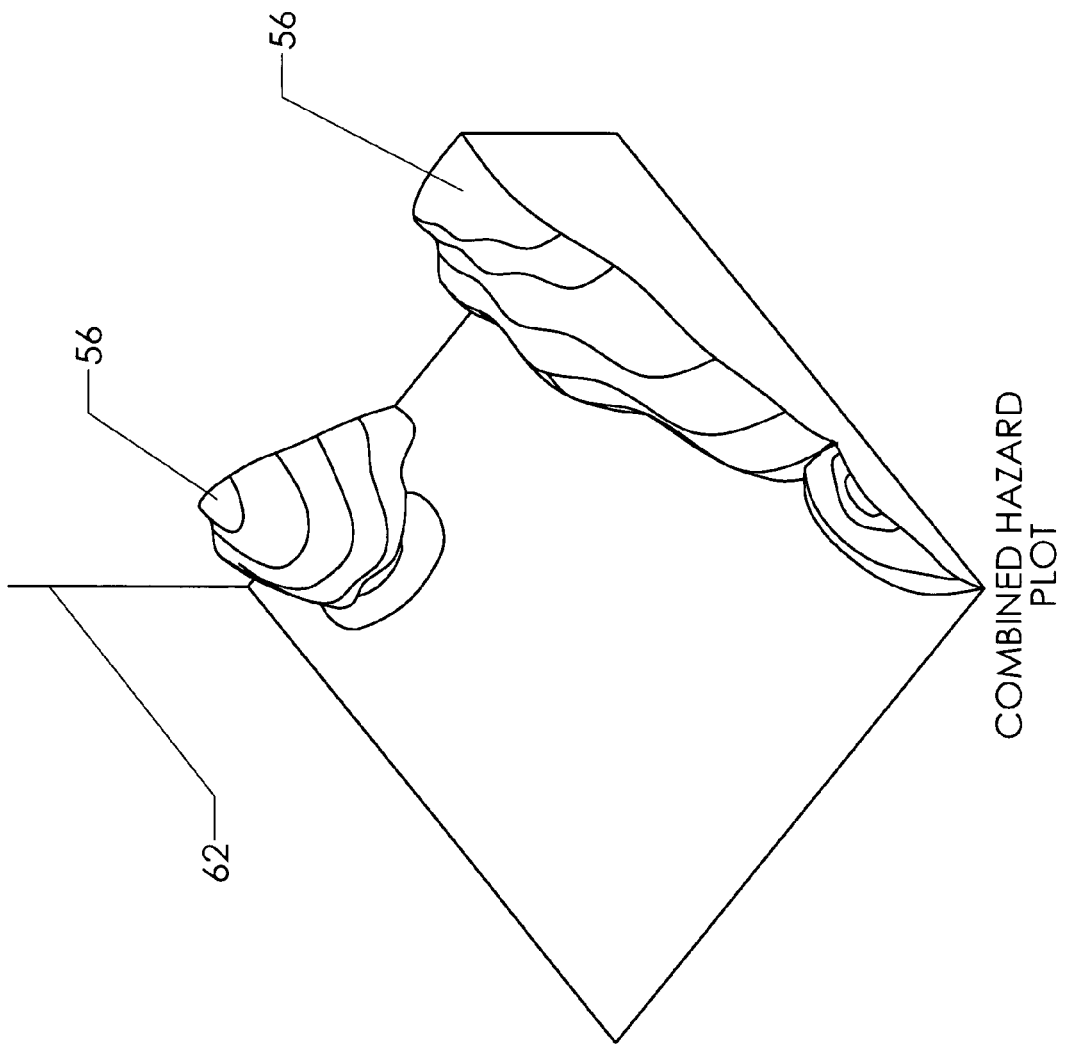
FIG. 11 is a three-dimensional representation of terrain and probabilistic weather hazards.

FIGS. 10 and 11 illustrate how multiple hazards may be combined into a single, integrated display. The left view in FIG. 10 shows terrain hazards 52 as a function of altitude 44. Terrain hazards 52 may be mountain peaks, skyscrapers, or other ground-based hazards. The right view in FIG. 10 shows weather hazards 54 as a function of altitude 44. Weather hazards 54 reveal areas where there is a high probability of turbulence, hail, or lightening. FIG. 11 shows the combination of weather and terrain hazards as combined hazard 56. These are four-dimensional plots which show increasing risk the further one travels into the hazard zone. The reader will note that in FIG. 11, combined hazard plots 56 are shown relative to risk aversion scale 62. In most cases, risk aversion scale 62 correlates with altitude. The concept of navigating through such terrain is familiar to aviation personnel and the decision support tools may utilize common algorithms for terrain following. The area/time described can be considered as a topographical probability density surface. The trajectory should fly a safe separation "above" the probability values. The safe separation is a function of the physical safety and the risk aversion of the users. Using such a display, an avoidance path may be chosen which avoids high hazard probabilities by a defined risk aversion factor.

Although risk aversion scale 62 most often correlates with altitude, this is not always the case. For example, the most common avoidance to icing conditions is to descend to a lower altitude. "Icing" refers to a phenomenon when an aircraft's wing begins to accumulate ice. The accumulated ice both adds weight to aircraft and changes the shape of the airfoil. If the airfoil accumulates enough ice, the aircraft may stall.

In an actual display, the display of combined hazard may be modified from FIG. 11 to show combined hazard 56 as a function of altitude (instead of risk aversion scale 62). In such a display, combined hazard 56 may appear as hazard of varying intensity (e.g., depicted by different shades of color). In one example, terrain hazards may appear in bright red since it would never be acceptable to fly through terrain. Precipitation or light turbulence, however, might not be a significant hazard to a particular aircraft or pilot. Less significant hazards and areas where hazard probability is low may be illustrated in lighter shades or alternate colors. This feature allows a pilot to consider his or her personal risk tolerance when evaluating whether to penetrate a hazard region or avoid the region altogether. For example, a corporate pilot may be willing to fly through significant weather hazards to pick up the company's CEO on time, but may prefer to alter the return route to provide a smooth route when the pilot's boss is on board.

Figure 12:
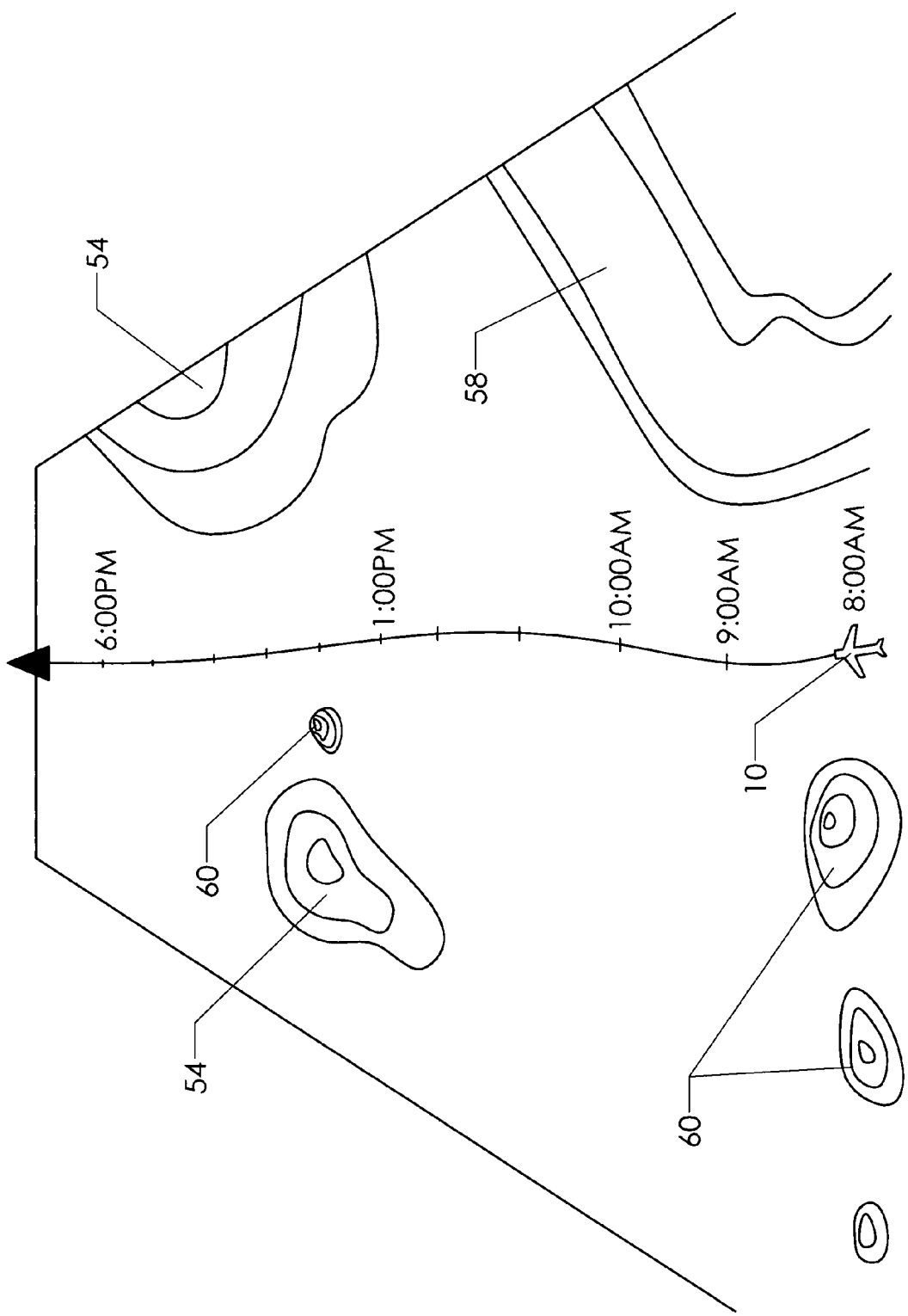
FIG. 12 is a three-dimensional representation of probabilistic hazards and an aircraft route avoiding the hazards.
Figure 13:
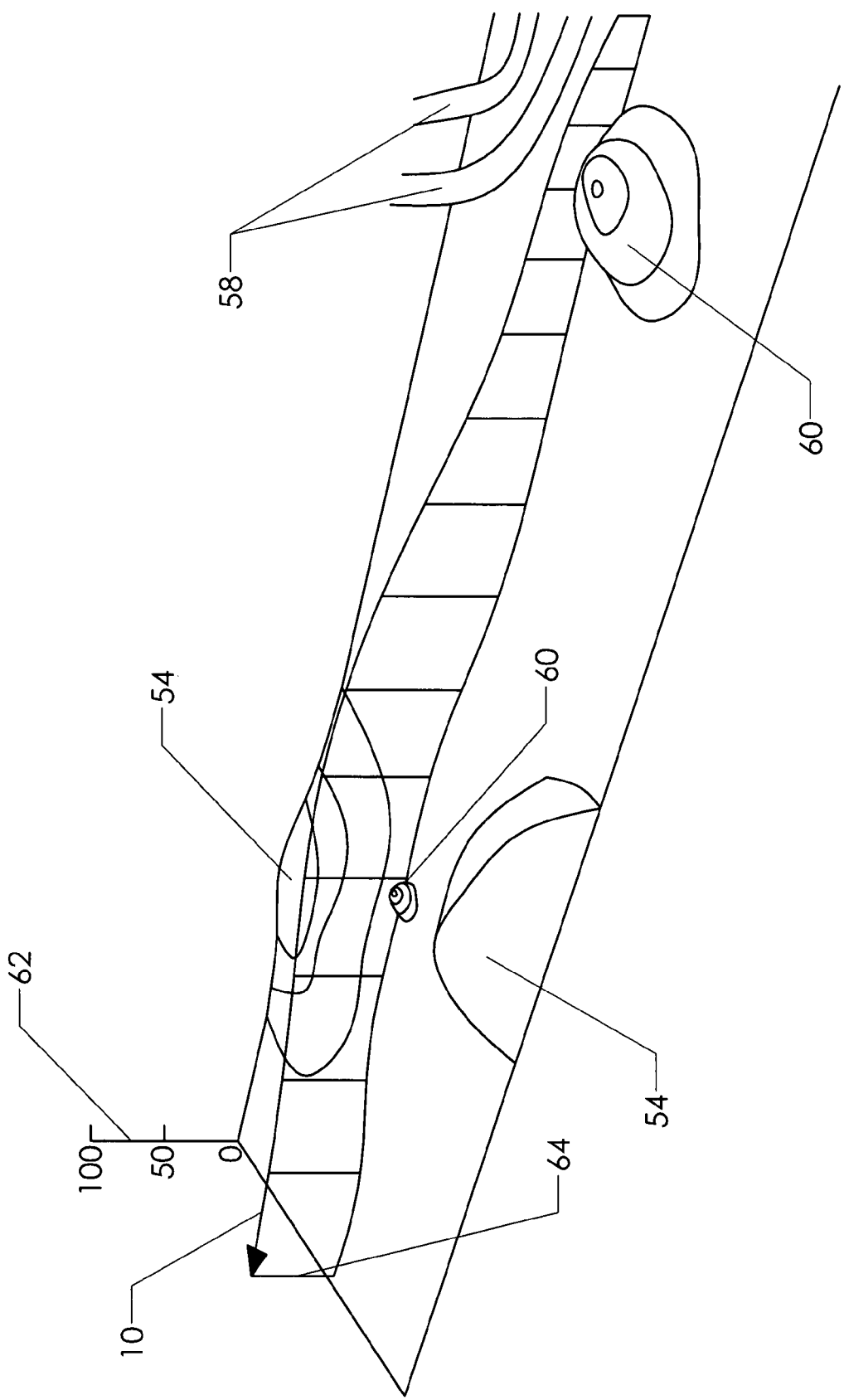
FIG. 13 is a three-dimensional representation of probabilistic hazards and an aircraft route avoiding the hazards.

FIGS. 12 and 13 shows a graphical depiction in which the hazard probabilities are visually presented as volumes of space. FIGS. 12 and 13 illustrate the same aircraft trajectory, planned route 10, from different perspectives. Several hazards are illustrated in the display including, terrain hazards 60, traffic hazard 58, and weather hazards 54. Planned route 10 is marked with time intervals to indicate the approximate time the aircraft will pass through the point in space if planned route 10 is followed. Traffic hazards 58 indicate areas where there is a high probability of aircraft traffic around the airport. Traffic hazards 58 correspond to the approach and departure vectors for the airport. These hazards get "taller" and more "diffuse" further from the airport. Weather hazards 54 are shown in the distance. These volumes represent anticipated weather at these locations several hours in the future. Future weather hazards may appear larger and less distinct, because of increasing uncertainty as one looks forward in time. Terrain hazards 60 remain static over time. FIG. 13 better illustrates the relationship of risk aversion scale 62. The vertical lines under planned route 10 illustrate the instantaneous risk aversion 64 of the aircraft at a series of points along the aircraft's trajectory.

Those skilled in the art will realize that the graphical depiction of weather hazards 54 in FIGS. 12 and 13 are based on certain assumptions of time—namely that the aircraft follows the planned route at the planned time and speed. In order to create the avoidance path, the aircraft's performance must be known and considered. If the aircraft slows down or enters a circular hold at some point rather than continuing along its projected path, the hazard probability "mountains" will change and a new avoidance path may need to be determined.

Figure 14:
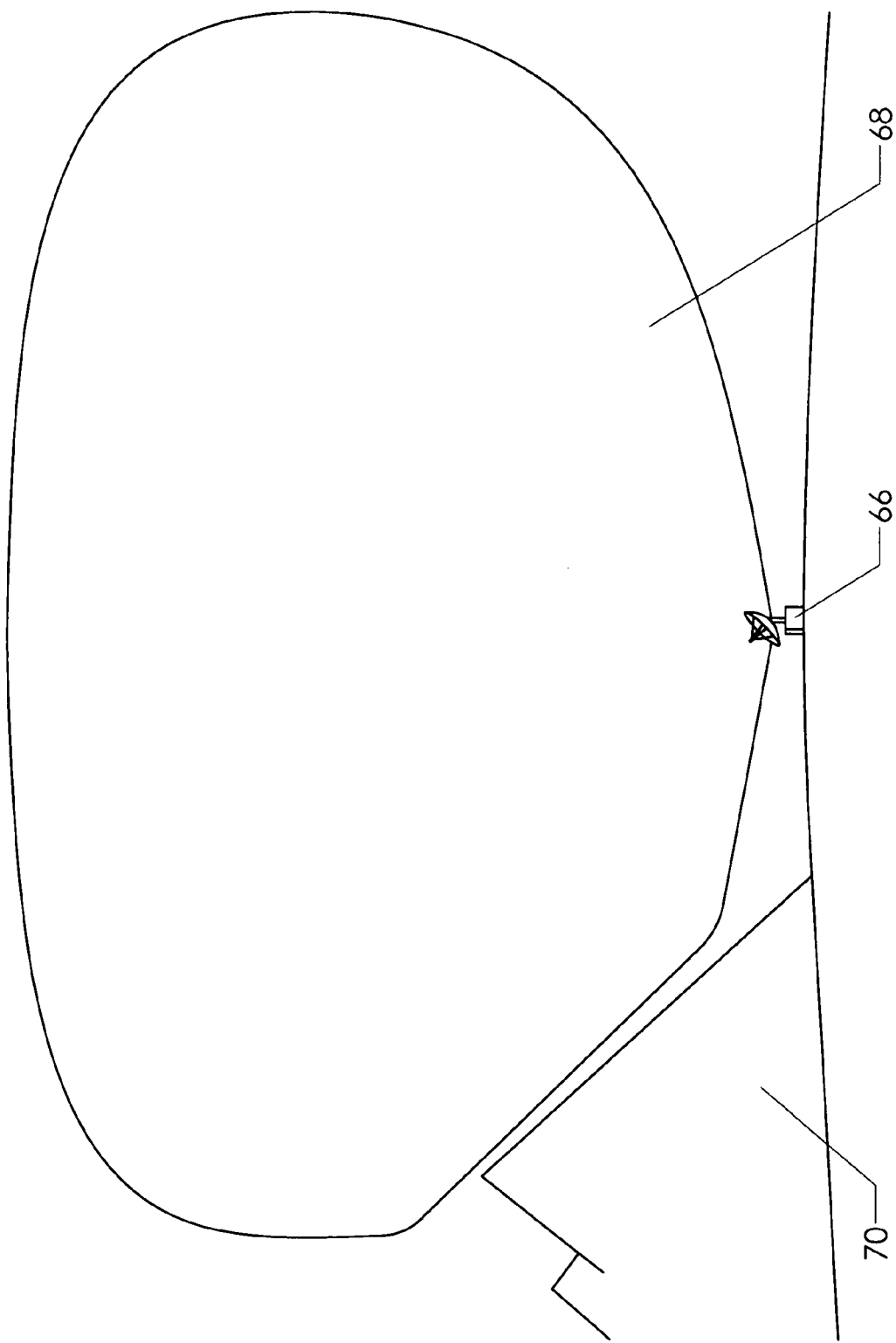
FIG. 14 is an illustration of the effect of terrain on a radar coverage zone.
Figure 15:
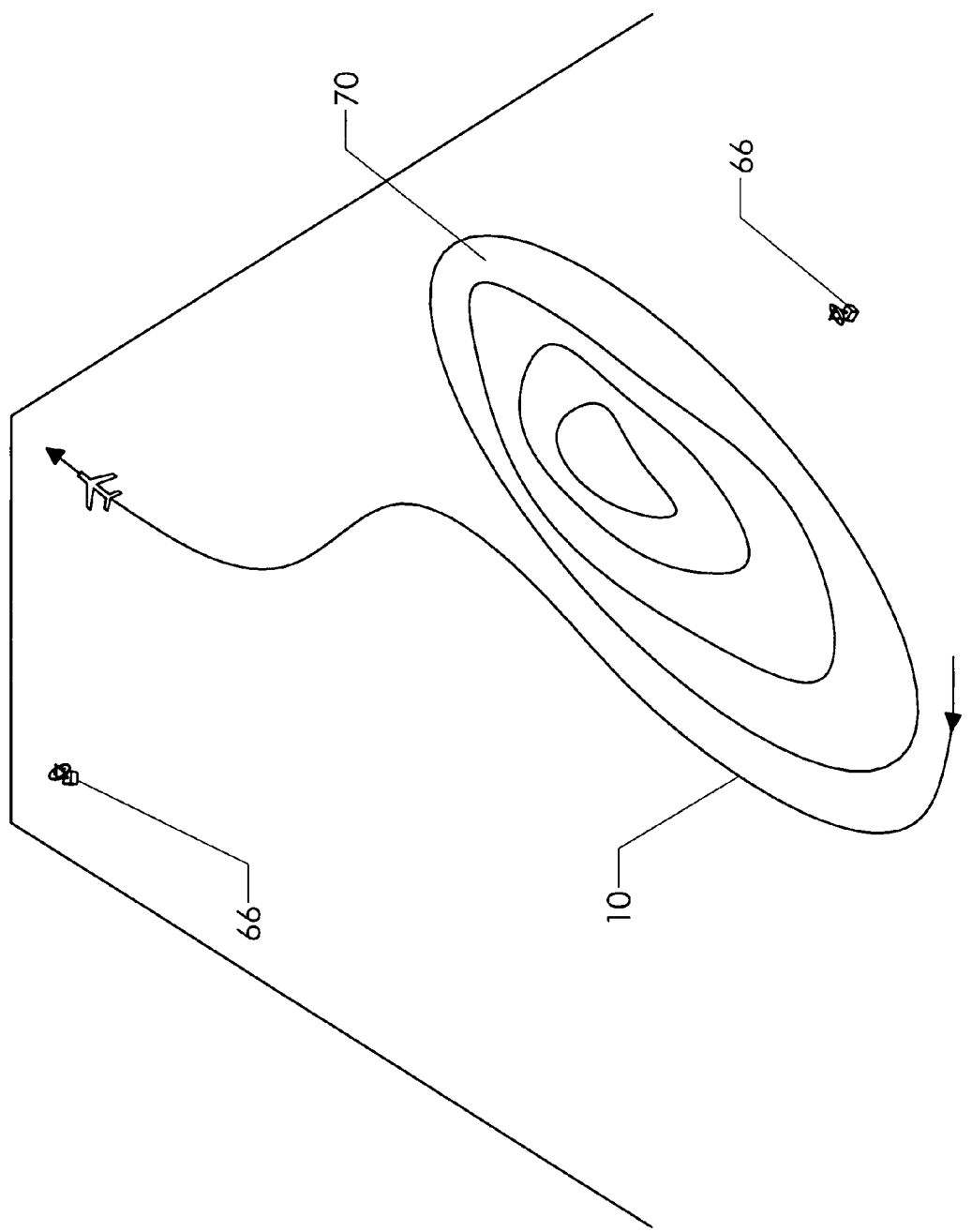
FIG. 15 is an illustration of how terrain may be used to avoid radar detection.
Figure 16:
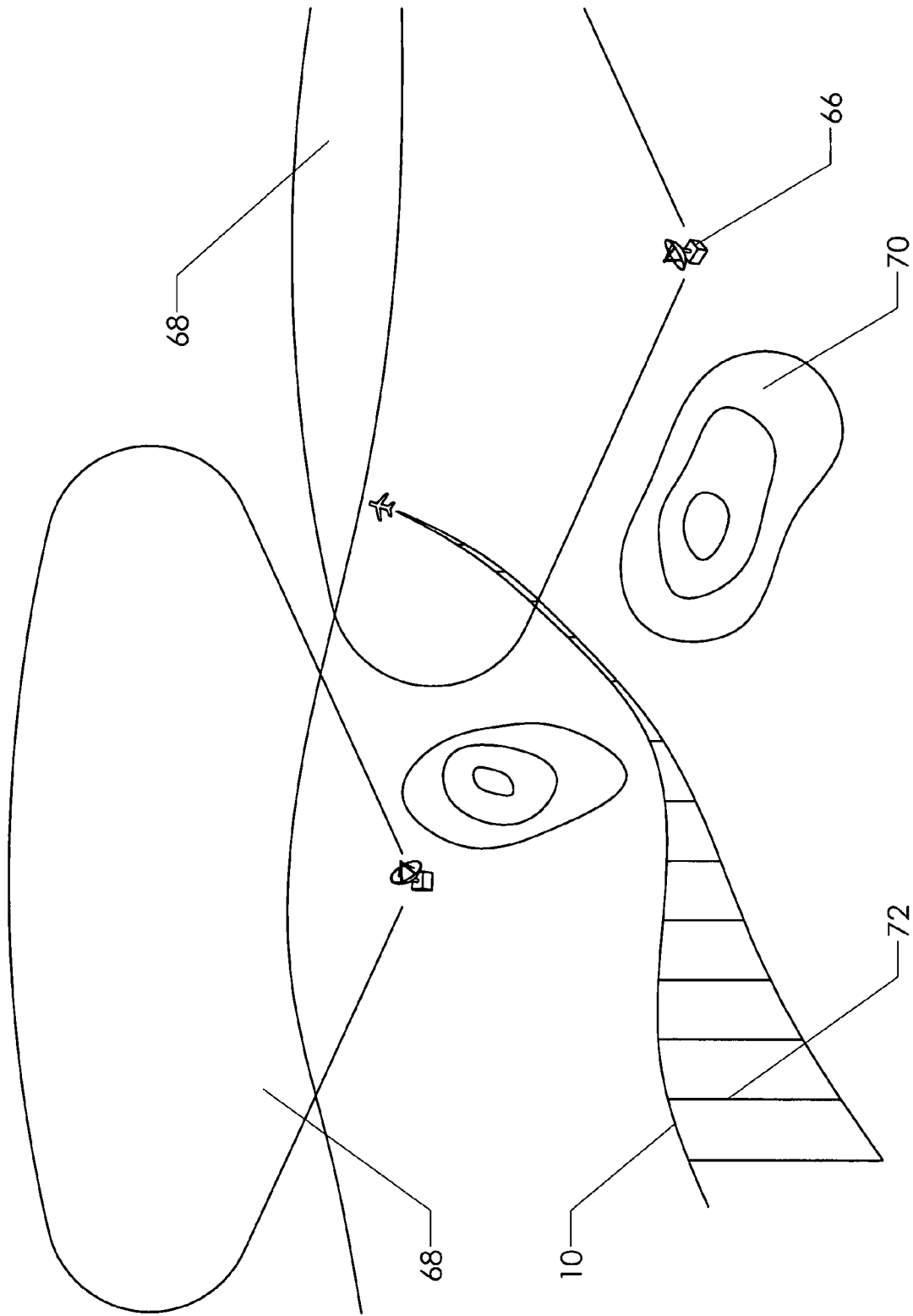
FIG. 16 is an illustration of how terrain may be used to avoid radar detection.

FIGS. 14-16 illustrate how the present invention can be used in military applications to assist military aircraft avoid radar detection. FIG. 14 illustrates radar coverage zone 68 for ground radar installation 66. Radar coverage zone 68 is limited by terrain 70 and altitude. FIG. 15 shows how a military aircraft can fly a route (planned route 10) using terrain 70 to make its way between two radar installations 66. FIG. 16 shows how the display can be used to plan an appropriate route. In this illustration, altitude above ground level ("AGL") 72 is illustrated by vertical lines beneath planned route 10. Altitude AGL 72 indicates the successive altitudes attained by an aircraft flying along planned route 10. Of course, weather hazards may also be added to the display. The pilot or planner may then use vehicle-specific or mission-specific parameters to control the display. As an example, if the radar sites control known surface-to-air missiles (SAMs), the pilot or planner might be willing to risk severe weather to avoid radar detection.

Figure 17:
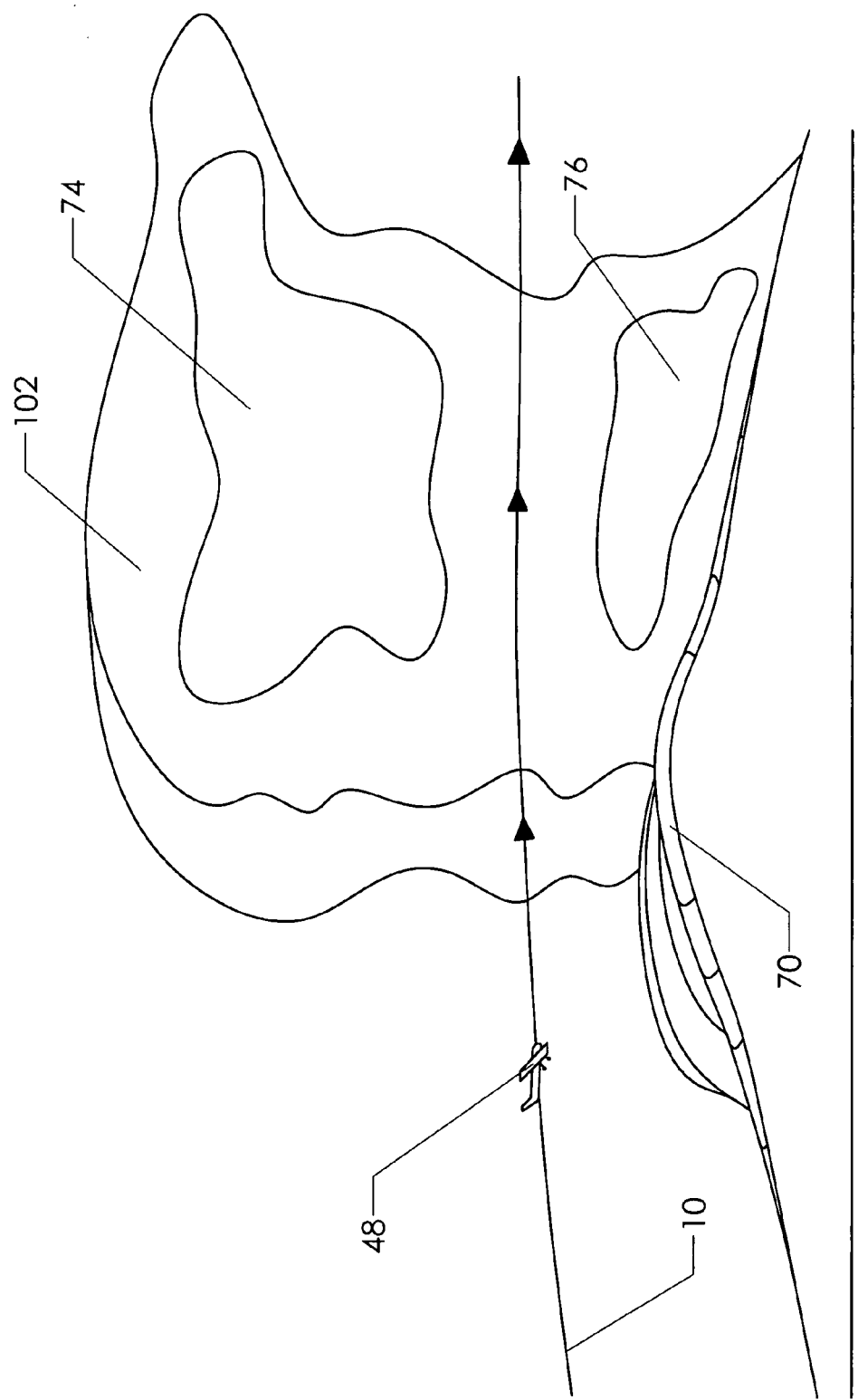
FIG. 17 is a section view, showing the internal details of a volumetric representation of a probabilistic weather hazard.

FIG. 17 is illustrates a "layered" hazard display. The hazards have been cut (a single planar slice) in this view to show to show the internal details of the hazard. Terrain 70 has no internal details since flying through part of terrain 70 is never acceptable. The weather hazards, however, have internal details. It is preferable that these internal details be indicated by varying color or labeling. FIG. 17 shows general aviation aircraft 48 approaching a weather hazard along planned route 10. Low visibility hazard 102 indicates a risk of clouds and light rain. The aircraft can fly through these conditions, but icing hazard 74 and turbulence hazard 76 pose significant risk to general aviation aircraft 48. Even if the aircraft can safely fly through low visibility hazard, it is possible that the pilot is not trained for flying in such conditions. A non-instrument rated pilot can only legally fly through VFR (visual flight rule) conditions. Significant areas of low visibility are known as IMC (instrument mandated conditions). Thus, if the subscribing pilot is a non-instrument rated pilot, the whole hazard would not have any interior features and the pilot would be informed that he must avoid the weather hazard altogether. If, on the other hand, the pilot is instrument rated, the display would show a safe route through the weather hazard.

The decision support tool applications may be further configured to evaluate planned routes and suggest alternate routes where the planned route is likely to encounter a hazard which exceeds the operator's risk aversion for the hazard. In order to do this, the decision support tools require as inputs (1) the objective hazards that the vehicle must avoid to be safe, and (2) the probability of those hazards that the operator of the vehicle can accept or not accept. The operator may add a value of avoidance for particular probabilities that defines that operator's risk aversion for that hazard. So if the operator selects a trajectory and there is a probability of 70% at a point for a hazard for which the operator has stated a 50% "clearance" is needed (i.e. a maximum of 50% probability of that hazard can be accepted), the decision support tool may indicate that the trajectory is unsafe and/or may recalculate a different route with lower probability of hazard. Sometimes this change may be a delay in departure which maintains the original three-dimensional trajectory if the delay causes the probability of hazard to drop to within an acceptable range.

To identify an acceptable trajectory through the four-dimensional grid of hazard probabilities, the decision support tools define the initially proposed trajectory through that grid in four dimensions. The decision support tool can be configured to "know" the maneuvering capability of the aircraft in climb, descent and turn, and may investigate hazard probabilities that are above, below, left and right of each point on the trajectory and which can be reached in a period of time. The probabilities of hazards around the trajectory may be considered and the decision support tool may define a trajectory that attempts to remain in the ideal "probabilistic values." If the trajectory cannot remain within the parameters defined by the user, then the trajectory cannot continue in a particular direction and will need to be re-routed earlier to avoid the hazards.

Figure 18:
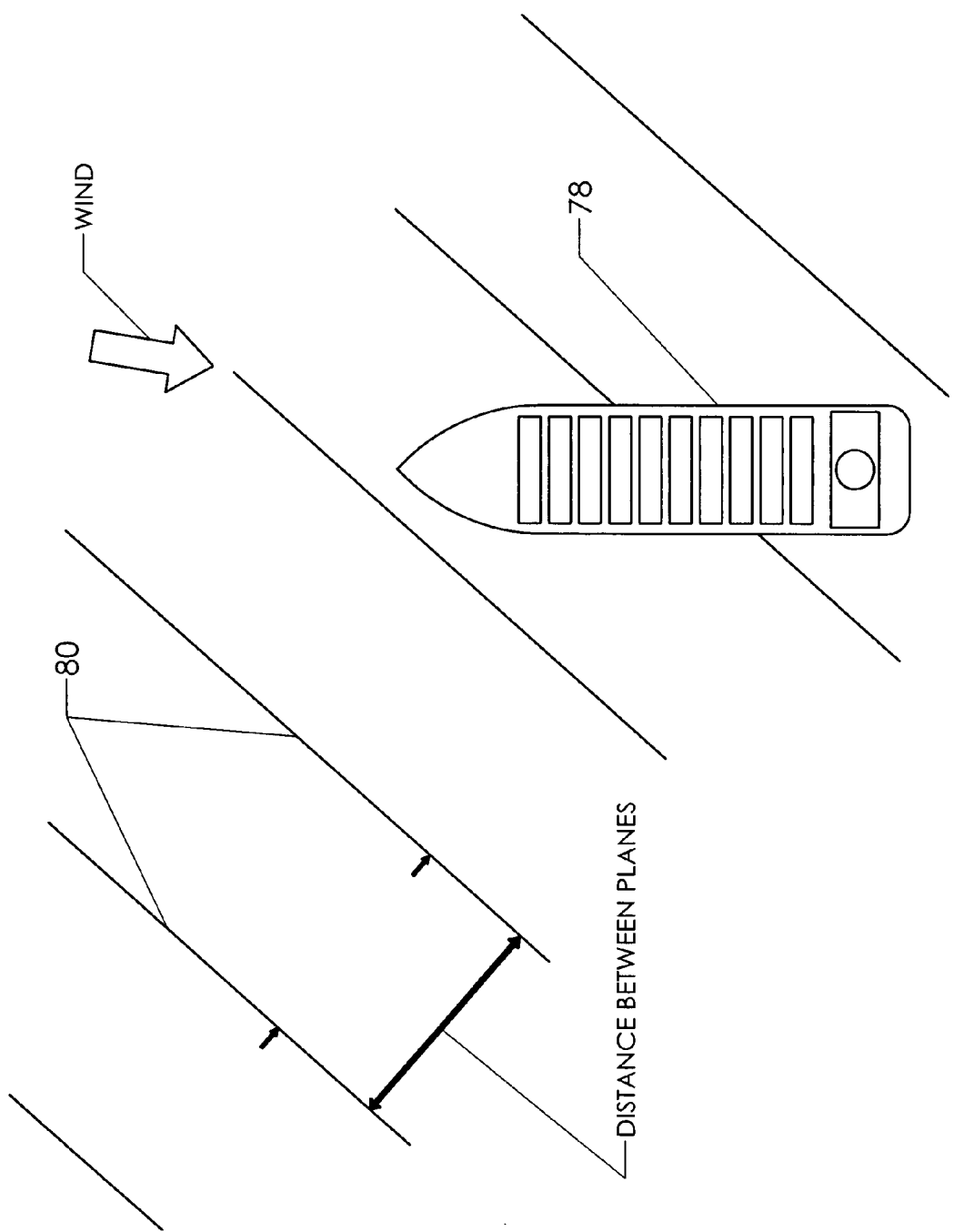
FIG. 18 is an illustration of a container ship encountering waves and wind.

It is preferable that the representations of hazards displayed on decision support tools be vehicle-specific. FIGS. 18 and 19 illustrate an example of a hazard display for container ships. This particular example considers hazards that might affect container ship 78. In FIG. 18, waves, identified as wave crests 80, are approaching container ship 78 from the North-Northwest while the wind is approaching from the North-Northeast. Container ship 78 has specific characteristics (including length, width, center of gravity, rolling characteristics) which make it vulnerable to certain wind and wave combinations. It should be noted that some conditions which are safe for a large ship may pose a greater danger to a smaller ship, and vice versa. For example, certain long ships (such as container ship 78) are more vulnerable to waves having a long crest-to-crest distance than shorter ships.

FIG. 19 shows a two-dimensional hazard plot for the container ship example. Because a watercraft cannot alter its altitude like an aircraft, a two-dimensional display is sufficient to show the hazards relevant to the watercraft. The watercraft operator is only concerned with hazards that may exist around sea level. As shown in FIG. 19, land 82 and shallow hazard 86 indicate terrain hazards. These terrain hazards are generally static except to the extent that the tide level influences the shape of shallow hazard 86. Wave/wind hazard 84 is much more dynamic. As shown in FIG. 19, the planner is able to use the display to determine planned route 10 for container ship 78 which avoids potential hazards that are of concern to container ship 78. If conditions change differently than anticipated, the route may be altered to avoid the projected location of the hazards.

Referring back to FIG. 22, decision makers using DST applications 100 obtain data for the hazard displays via application program interface 98. The amount and type of data transmitted to DST applications 100 can vary based on (1) the resources available to DST application 100, (2) the nature of the hazards of concern to the decision maker, and (3) the level of decision autonomy desired by the decision maker. On one extreme, an inexperienced pilot may simply want a display of potential hazards that are in the general vicinity of his planned route. In this example, the inexperience pilot visualization application may require the hazard data to be pre-processed to the level of an image or video feed. This particular pilot and aircraft may therefore have one type of subscription in which only processed image data is transmitted to the visualization tool.

On the other extreme, a military aircraft may want hazard data that includes specific hazard parameters or risk models. The DST application used by the military decision maker may be capable of processing the hazard parameters and risk models to optimize routes and generate displays based on the risk models and parameters. In the military context it may be preferable for the determination of hazards and evaluation of routes be performed independently by the decision maker's DST. The military aircraft would therefore utilize a different type of subscription than the inexperienced pilot of the previous example.

It is further contemplated that the transmission of hazard data be updated continuously, at designated time intervals, or when new input data is received by the grid. Also, new data may be transmitted when the vehicle deviates from its originally planned trajectory. For example, if an aircraft does not depart at the planned time, new hazard data may be acquired to update the display. Thus, the timing of data transmissions may be varied as required as needed for the particular application.

Referring back to FIG. 20, conversion software 90 is used to convert observed/reported information 88 into data that can be input into grid 92. Observed/reported information 88 includes many currently available weather products. Thus, conversion software 90 employs processing algorithms which are capable of converting data from existing weather products into deterministic values which can be fed to grid 92. These processing algorithms will vary depending on the particular weather product that is used. For example, radar returns detailing raindrop density for a particular geographic region may be fed directly to conversion software 90. Conversion software 90 then can correlate the raindrop density data to specific nodes on grid 92 at the time of the radar return. Drop density values may then be applied directly to grid 92 as a parameter. Alternatively, drop density data may be pre-processed using known meteorological models to compute other hazard parameters to be fed into grid 92.

Although the preceding descriptions contain significant detail, they should not be construed as limiting the scope of the invention but rather as providing illustrations of the preferred embodiments of the invention. As an example, although the description details how probabilistic forecasting can be used for weather hazards, the same principles can be applied to other aviation hazards such as SAM (Surface to air missile) sites in a combat environment and to hazard prediction in non-aviation related industries such as frost or heavy rain affecting the construction industry. Accordingly, the scope of the present invention should be defined by the claims and not the examples given.

Having describe my invention, I claim:

1. A process for forecasting a probability of at least one a hazard existing at a plurality of three-dimensional points in space at a plurality of times comprising:
   a. providing a computer program product, including a non-transitory computer readable medium having a computer readable program code embodied therein, said computer readable program code adapted to be executed to implement a four-dimensional grid of probability values;
   b. wherein said four-dimensional grid comprises a plurality of individual nodes separated by defined increments in longitude, latitude, altitude, and time;
   c. providing a first set of raw data input to said computer program product, said raw data input including known values for defined input parameters for at least some of said plurality of individual nodes within said four-dimensional grid, said raw data input including data drawn from at least two separate sources;
   d. providing within said computer program product a set of rules which relate each of said plurality of nodes to its neighboring nodes whereby a value for one of said defined input parameters at a first node influences the calculation of a probability of said at least one hazard for nodes neighboring said first node, said set of rules being applied by said computer program product;

e. using said computer program product to transform said first set of raw data into a first set of gridded hazard probability data, said first set of gridded hazard probability data describing the likelihood of said hazard existing at each of said nodes at said first time in the future, said computer program product further configured to use said first set of gridded hazard probability data to produce a series of gridded hazard probability data for each of said nodes at fixed time intervals into the future describing the likelihood of said hazard existing at each of said nodes at said fixed time intervals into the future; and f. using said first and subsequent sets of gridded hazard probability data as part of a decision support tool provided as part of said computer program product.

2. The process of claim 1, said raw hazard data describing convective weather conditions for a region.

3. The process of claim 1, wherein said decision support tool is configured to use said first and subsequent sets of gridded hazard probability data and to determine a safe route of travel for a vehicle.

4. The process of claim 3, further comprising:
a. providing said decision support tool in said computer program product with information regarding a planned route of a defined vehicle, said information including the time when said defined vehicle is expected to occupy each position along said route; and
b. retrieving portions of said first and subsequent sets of gridded hazard probability data for the anticipated position of said defined vehicle and the anticipated time when said defined vehicle will occupy said position.

5. A process for forecasting a probability of a hazard existing at a first three-dimensional point in space at a first time comprising:
a. providing a first computer program product, including a non-transitory computer readable medium having a computer readable program code embodied therein, said computer readable program code adapted to be executed to implement a four-dimensional grid of probability values;
b. wherein said four-dimensional grid comprises a plurality of individual nodes separated by defined increments in longitude, latitude, altitude, and time;
c. providing a first set of hazard raw data including at least one of an observed past location of a known value for a defined input parameter at one of said nodes and or a forecasted future value of said defined input parameter at one of said nodes;
d. providing within said first computer program product a set of rules which relate each of said plurality of nodes to its neighboring nodes whereby a value for one of said defined input parameters influences the calculation of a probability of said at least one hazard for its neighboring nodes, said set of rules being applied by said first computer program product;
e. using said first computer program product providing a computer configured to utilize said first set of hazard data to produce a first set of gridded hazard probability data, said first set of gridded hazard probability data describing the likelihood of said hazard existing at said first three-dimensional point in space and other three dimensional points in space neighboring said first three-dimensional point in space at said first time in the future, said first computer program product further using said first set of gridded hazard probability data to produce a second set of gridded hazard probability data describing the likelihood of said hazard existing at said first three-dimensional point in space and said other three-dimensional points in space neighboring said first three-dimensional point in space at a second time after said first time;

f. providing a second computer program product, said second computer program product including a decision support tool remote to said first computer program product, said decision support tool providing output to having a display;

g. transmitting said first set of gridded hazard probability data and said second set of gridded hazard probability data from said first computer program product to said second computer program product to said decision support tool; and displaying visual representations of said first set of gridded hazard probability data and said second set of gridded hazard probability data on said display of said decision support tool; and h. displaying visual representations of said first set of gridded hazard probability data and said second set of gridded hazard probability data on said display.

6. The process of claim 5, wherein said second computer program product is contained in a vehicle.

7. The process of claim 6, wherein said first computer program product is configured to transmit only a subset of said first set of gridded hazard probability and said second set of gridded hazard data determined by said first computer program product, said subset corresponding to a geographic region of interest to said vehicle.

8. The process of claim 5, said first set of raw data describing convective weather conditions for a region.

9. The process of claim 5, wherein said decision support tool is configured to use said first set of gridded hazard probability data and said second set of gridded hazard probability data to determine a safe route of travel for a vehicle.

10. The process of claim 5, said first computer program product employing a three-dimensional grid of intelligent agents to determine said first set of gridded hazard probability data and said second set of gridded hazard probability data, said three-dimensional grid of intelligent agents defining said set of rules which relate each of said plurality of nodes to its neighboring nodes, each of said plurality of nodes representing a fixed three-dimensional position in space including said first three-dimensional point in space, each of said plurality of nodes configured to determine a hazard probability for the fixed three-dimensional position in space represented by the node for said second time utilizing hazard probabilities determined for each of said plurality of nodes for said first time.

11. A method for forecasting hazard risks using a collection of observed and forecasted input parameters comprising:
a. providing a computer program product, including a non-transitory computer readable medium having a computer readable program code embodied therein, said computer readable program code adapted to be executed to implement a four-dimensional grid of probability values;
b. wherein said four-dimensional grid comprises a plurality of individual nodes separated by defined increments in longitude, latitude, altitude, and time;
c. using said computer program product to convert, said collection of observed and forecasted input parameters hazard data into gridded probabilistic data, said gridded probabilistic data being subdivided into probabilistic data lying at each of said nodes identifying a first three-dimensional point in space at a time and a value useful in determining a probability that a hazardous condition exists at each of said three-dimensional nodes at a first time;

d. using said computer program product and said gridded probabilistic data to determine a probability of a hazardous condition existing at each of said nodes at a first time and a second time; and e. exporting said probabilities determined by said computer program product or representations thereof for a geographic region of interest to a separate application, said geographic region of interest including a subset of said plurality of nodes lying within said geographic region of interest.

12. The method of claim 11, wherein said separate application is loaded on a remote decision support tool, and the step of exporting said probabilities determined by said computer or representations thereof for said geographic region of interest to said separate application includes wirelessly transmitting said probabilities determined by said computer program product or representations thereof to said remote decision support tool.

13. The method of claim 11, said collection of observed and forecasted input parameters hazard data including a weather product.

14. The method of claim 11, said collection of observed and forecasted input parameters including a Collaborative Convective Forecast Product.

15. The method of claim 11, wherein said input parameters include turbulence.

16. The method of claim 11, wherein said computer program product is configured to determine said probabilities of said hazardous condition existing at each of said plurality of nodes at said first time and said second time by modeling said geographic region of interest as a plurality of intelligent nodes, each of said plurality of intelligent nodes adapted to predict the probability of said hazardous condition existing at a point in space corresponding to said intelligent node using said gridded probabilistic data.

17. The method of claim 11, further comprising graphically displaying said region of interest as a three-dimensional space with volumetric representations of probabilistic hazards occupying portions of said three-dimensional space.

18. A method for creating a four-dimensional grid of probability data which can be used to provide four-dimensional hazard information, comprising:

a. providing a computer program product, including a non-transitory computer readable medium having a computer readable program code embodied therein, said computer readable program code adapted to be executed to implement a four-dimensional grid of probability values;

b. wherein said four-dimensional grid comprises a plurality of individual nodes separated by defined increments in longitude, latitude, altitude, and time;

c. defining at least one hazard for each node in said plurality of nodes;

d. providing raw data input to said computer program product, said raw data input including known parameters for at least some of said plurality of individual nodes within said four-dimensional grid, said raw data input including data drawn from at least two separate sources;

e. providing within said computer program product a set of rules which relate each of said plurality of nodes to its neighboring nodes whereby a value for a known parameter at a first node influences the calculation of a probability of said at least one hazard for its neighboring nodes, said set of rules being applied by said computer program product;

f. having said computer program product calculate a value of said probability of said at least one hazard for each of said nodes within said plurality of nodes for a first time; and g. having said computer program product calculate a value of said probability of said at least one hazard for each of said nodes within said plurality of nodes for a plurality of additional times later than said first time, whereby said probability of said at least one hazard for each of said nodes is computed for a plurality of times into the future.

19. The method of claim 18, said raw data describing convective weather conditions for a region.

20. The method of claim 18, wherein said decision support tool is configured to use said first and subsequent sets of probability data for each of said nodes to determine a safe route of travel for a vehicle.

21. The method of claim 20, further comprising:

a. providing a decision support tool in said computer program product, said decision support tool being provided with information regarding a planned route of a defined vehicle, said information including the time when said defined vehicle is expected to occupy each position along said route; and b. retrieving portions of said hazard probability data for the anticipated position of said defined vehicle and the anticipated time when said defined vehicle will occupy said position.

* * * * *